US011336837B2

(12) United States Patent
Bao et al.

(10) Patent No.: US 11,336,837 B2
(45) Date of Patent: May 17, 2022

(54) SYSTEM, METHOD, AND MOBILE PLATFORM FOR SUPPORTING BRACKETING IMAGING

(71) Applicant: SZ DJI TECHNOLOGY CO., LTD., Shenzhen (CN)

(72) Inventors: Linchao Bao, Shenzhen (CN); Lifu Yu, Shenzhen (CN); Zisheng Cao, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 193 days.

(21) Appl. No.: 16/016,099

(22) Filed: Jun. 22, 2018

(65) Prior Publication Data

US 2018/0302548 A1    Oct. 18, 2018

Related U.S. Application Data

(63) Continuation of application No. PCT/CN2015/098334, filed on Dec. 22, 2015.

(51) Int. Cl.
*H04N 5/225* (2006.01)
*H04N 5/232* (2006.01)
*H04N 5/235* (2006.01)
*G06K 9/00* (2022.01)
(Continued)

(52) U.S. Cl.
CPC ......... *H04N 5/2356* (2013.01); *G03B 15/006* (2013.01); *G03B 37/02* (2013.01); *G06K 9/0063* (2013.01); *H04N 5/2251* (2013.01); *H04N 5/2352* (2013.01); *H04N 5/2353* (2013.01);
(Continued)

(58) Field of Classification Search
None
See application file for complete search history.

(56) References Cited

U.S. PATENT DOCUMENTS

| 8,120,691 B2* | 2/2012 | Yu ...................... H04N 5/23293 348/208.1 |
| 8,959,555 B2* | 2/2015 | Monari ................ H04N 5/2252 725/74 |
| 9,565,419 B2* | 2/2017 | Presler ................. H04N 13/161 |

(Continued)

FOREIGN PATENT DOCUMENTS

| CN | 101052100 A | 10/2007 |
| CN | 103939718 A | 7/2014 |

(Continued)

OTHER PUBLICATIONS

Natasha et al. "Multi-exposure Imaging on Mobile Devices", ACM Oct. 25-29, 2010.*

(Continued)

*Primary Examiner* — Mohammad J Rahman
(74) *Attorney, Agent, or Firm* — Anova Law Group, PLLC

(57) ABSTRACT

A system for supporting imaging includes an imaging device configured to capture a plurality of images for a substantially same scene using respective imaging configurations, a stabilization device configured to stabilize the imaging device on a mobile platform during the capturing of the plurality of images, and a controller communicating with at least one of the imaging device or the stabilization device and configured to control an operation of the mobile platform.

20 Claims, 11 Drawing Sheets

(51) Int. Cl.
 *G03B 37/02* (2021.01)
 *G03B 15/00* (2021.01)
(52) U.S. Cl.
 CPC ..... *H04N 5/23248* (2013.01); *H04N 5/23254* (2013.01); *H04N 5/23277* (2013.01)

(56) References Cited

U.S. PATENT DOCUMENTS

| | | | | |
|---|---|---|---|---|
| 2002/0057289 A1* | 5/2002 | Crawford | ............... | G06Q 30/06 715/744 |
| 2004/0239798 A1* | 12/2004 | Nayar | ................. | H04N 5/2355 348/362 |
| 2008/0131016 A1* | 6/2008 | Kokemohr | .............. | G06T 5/009 382/254 |
| 2009/0040364 A1* | 2/2009 | Rubner | ................. | G06T 3/4053 348/362 |
| 2009/0207250 A1* | 8/2009 | Bennett | ................ | F16M 11/105 348/144 |
| 2010/0034424 A1* | 2/2010 | Goossen | ................... | F41G 3/02 382/103 |
| 2010/0092079 A1* | 4/2010 | Aller | ...................... | B42D 15/00 382/165 |
| 2010/0097443 A1* | 4/2010 | Lablans | ............... | H04N 5/3456 348/36 |
| 2010/0097444 A1* | 4/2010 | Lablans | ............. | H04N 5/23238 348/46 |
| 2010/0110192 A1* | 5/2010 | Johnston | ............. | H04N 5/2251 348/148 |
| 2010/0188486 A1* | 7/2010 | Amanullah | ........ | G01N 21/9501 348/48 |
| 2010/0321509 A1* | 12/2010 | Torii | .................. | H04N 5/23212 348/208.4 |
| 2011/0221900 A1* | 9/2011 | Reich | ..................... | F16M 11/18 348/144 |
| 2012/0200703 A1 | 8/2012 | Nadir et al. | | |
| 2012/0201526 A1* | 8/2012 | Tanaka | ................. | H04N 5/2251 396/55 |
| 2012/0290950 A1* | 11/2012 | Rapaport | ........... | H04N 21/8358 715/753 |
| 2012/0316685 A1* | 12/2012 | Pettersson | ............. | F16M 11/18 700/275 |
| 2013/0335555 A1* | 12/2013 | Demandolx | ......... | H04N 5/3741 348/135 |
| 2013/0335596 A1* | 12/2013 | Demandolx | ........... | H04N 5/772 348/231.99 |
| 2014/0085507 A1* | 3/2014 | Pillman | .............. | H04N 5/23222 348/231.99 |
| 2014/0126835 A1* | 5/2014 | Shioya | ................. | H04N 5/2356 382/274 |
| 2014/0192233 A1* | 7/2014 | Kakkori | ................ | H04N 5/265 348/239 |
| 2014/0211031 A1* | 7/2014 | Han | .................... | H04N 5/23222 348/208.99 |
| 2014/0267914 A1* | 9/2014 | Sfaradi | .............. | H04N 5/35554 348/571 |
| 2014/0340570 A1* | 11/2014 | Meyers | ................ | H04N 5/2256 348/370 |
| 2015/0002686 A1* | 1/2015 | Karpenko | ................ | H04N 5/77 348/208.6 |
| 2015/0350516 A1* | 12/2015 | Rivard | ................... | H04N 5/243 348/229.1 |
| 2016/0005154 A1* | 1/2016 | Meyers | ................... | G06T 5/008 382/274 |
| 2016/0035069 A1* | 2/2016 | Min | ........................ | G06T 5/007 382/266 |
| 2016/0066833 A1* | 3/2016 | Yaroslavsky | ........ | A61B 5/4848 600/310 |
| 2016/0112650 A1* | 4/2016 | Laroia | .................. | H04N 5/2257 348/239 |
| 2016/0114887 A1* | 4/2016 | Zhou | ........................ | B60F 5/02 348/148 |
| 2017/0067739 A1* | 3/2017 | Siercks | ................ | H04N 5/2252 |

FOREIGN PATENT DOCUMENTS

| | | |
|---|---|---|
| CN | 203740142 U | 7/2014 |
| CN | 104808680 A | 7/2015 |
| CN | 105045279 A | 11/2015 |
| CN | 105120136 A | 12/2015 |

OTHER PUBLICATIONS

The World Intellectual Property Organization (WIPO) International Search Report and Written Opinion for PCT/CN2015/098334 dated Sep. 14, 2016 3 Pages.

* cited by examiner

SYSTEM, METHOD, AND MOBILE PLATFORM FOR SUPPORTING BRACKETING IMAGING

CROSS-REFERENCE TO RELATED APPLICATION

This application is a continuation of International Application No. PCT/CN2015/098334, filed on Dec. 22, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to image processing and more particularly, but not exclusively, to systems, methods and mobile platforms for supporting imaging.

BACKGROUND

Mobile platforms, such as manned and unmanned vehicles, can be used for performing surveillance, reconnaissance, and exploration tasks for various applications. For example, an unmanned aerial vehicle (UAV) may be outfitted with a functional payload, such as a camera for capturing images, such as digital images. When used for capturing natural scenery, UAVs may encounter challenging conditions, such as a significant variation of lighting environment in natural scenery.

In view of the foregoing, there is a need for systems, mobile platforms and methods that can generate images in natural scenery.

SUMMARY OF THE DISCLOSURE

The present disclosure relates to a system for supporting imaging and methods for making and using same.

In accordance with a first aspect disclosed herein, there is set forth a method for supporting imaging, including:
  stabilizing an imaging device on a mobile platform; and
  capturing a plurality of images with respective imaging configurations for a substantially same scene via the imaging device.

In some embodiments of the disclosed method, the capturing includes capturing the plurality of images for a same scene.

In some embodiments of the disclosed method, the method further includes generating a resultant image based on the plurality of images captured using the respective imaging configurations.

In some embodiments of the disclosed method, the generating includes fusing the plurality of images captured into the resultant image.

In some embodiments of the disclosed method, the stabilizing includes stabilizing the imaging device against a motion of the mobile platform.

In some embodiments of the disclosed method, the stabilizing includes keeping a spatial misalignment between the plurality of images to be below a predetermined misalignment threshold.

In some embodiments of the disclosed method, the method further includes fusing the plurality of images into a resultant image without performing image registration among the plurality of images.

In some embodiments of the disclosed method, the method further includes obtaining one or more imaging parameters including at least one parameter for selecting the respective imaging configurations, at least one parameter for processing a resultant image based on the plurality of images, or a combination thereof.

In some embodiments of the disclosed method, the method further includes using the imaging device to capture the plurality of images with respective imaging configurations including bracketing configurations.

In some embodiments of the disclosed method, the method further includes using the imaging device to capture the plurality of images with the bracketing configurations including respective exposure configurations.

In some embodiments of the disclosed method, the method further includes using the imaging device to capture the plurality of images with the respective exposure configurations based on an exposure value difference.

In some embodiments of the disclosed method, the method further includes fusing the plurality of images captured using the respective exposure configurations into a resultant image having a composite dynamic range that is greater than a dynamic range of a selected image among the plurality of images.

In some embodiments of the disclosed method, the method further includes generating a resultant image based on the plurality of images captured using the respective imaging configurations and storing the resultant image.

In some embodiments of the disclosed method, the method further includes rendering the resultant image into a preview image.

In some embodiments of the disclosed method, the rendering includes rendering the resultant image into the preview image via tone mapping.

In some embodiments of the disclosed method, the method further includes downsizing the resultant image before the rendering.

In some embodiments of the disclosed method, the downsizing includes downsampling the resultant image.

In some embodiments of the disclosed method, the method further includes demosaicing the resultant image before the rendering.

In some embodiments of the disclosed method, the method further includes capturing another plurality of images by using other respective imaging configurations selected based on a presentation of the preview image.

In some embodiments of the disclosed method, the method further includes capturing another plurality of images for the substantially same scene by using other respective imaging configurations.

In some embodiments of the disclosed method, the method further includes capturing another plurality of images for a different scene by using the respective imaging configurations.

In some embodiments of the disclosed method, the stabilizing includes stabilizing the imaging device by controlling a gimbal that couples the imaging device to the mobile platform.

In accordance with another aspect disclosed herein, there is set forth a method for supporting imaging based on a mobile platform, including:

stabilizing an imaging device on the mobile platform; and using the imaging device to capture a plurality of images for a substantially same scene with respective imaging configurations.

In accordance with another aspect disclosed herein, there is set forth a system for supporting imaging, including:

a stabilization device that operates to stabilize an imaging device on a mobile platform; and a controller that operates to direct the imaging device to capture a plurality of images for a substantially same scene with respective imaging configurations.

In some embodiments of the disclosed system, the controller that operates to direct the imaging device to capture the plurality of images for a same scene with the respective imaging configurations.

In some embodiments of the disclosed system, the system further includes one or more image processors that operate to generate a resultant image based on the plurality of images captured using the respective imaging configurations.

In some embodiments of the disclosed system, the image processors operate to generate the resultant image by fusing the plurality of images captured using the respective imaging configurations.

In some embodiments of the disclosed system, the stabilization device operates to stabilize the imaging device against a motion of the mobile platform.

In some embodiments of the disclosed system, the stabilization device operates to keep the plurality of images to have a spatial misalignment below a predetermined misalignment threshold.

In some embodiments of the disclosed system, the system further includes one or more image processors that operate to fuse the plurality of images without performing image registration among the plurality of images.

In some embodiments of the disclosed system, the system further includes obtaining one or more imaging parameters including at least one parameter for selecting the respective imaging configurations, at least one parameter for processing a resultant image based on the plurality of images, or a combination thereof.

In some embodiments of the disclosed system, the imaging device operates to capture the plurality of images by using respective bracketing configurations.

In some embodiments of the disclosed system, the imaging device operates to capture the plurality of images by using respective exposure configurations.

In some embodiments of the disclosed system, the imaging device operates to capture the plurality of images with the respective exposure configurations based on an exposure value difference.

In some embodiments of the disclosed system, the system further includes one or more image processors that operate to fuse the plurality of images captured using the respective exposure configurations into a resultant image having a composite dynamic range that is greater than a dynamic range of a selected image among the plurality of images.

In some embodiments of the disclosed system, the system further includes one or more image processors that operate to generate a resultant image based on the plurality of images captured using the respective imaging configurations and store the resultant image.

In some embodiments of the disclosed system, the image processors operate to render the resultant image into a preview image.

In some embodiments of the disclosed system, the image processors operate to render the resultant image into the preview image via tone mapping.

In some embodiments of the disclosed system, the image processors operate to downsize the resultant image before rendering the resultant image into the preview image.

In some embodiments of the disclosed system, the image processors operate to downsample the resultant image before rendering the resultant image into the preview image.

In some embodiments of the disclosed system, the image processors operate to demosaic the resultant image before rendering the resultant image into the preview image.

In some embodiments of the disclosed system, the imaging device operates to capture another plurality of images for the substantially same scene by using other respective imaging configurations based on a presentation of the preview image.

In some embodiments of the disclosed system, the imaging device operates to capture another plurality of images for the substantially same scene by using other respective imaging configurations.

In some embodiments of the disclosed system, the imaging device operates to capture another plurality of images for a different scene by using the respective imaging configurations.

In some embodiments of the disclosed system, the stabilization device includes a gimbal for coupling the imaging device to the mobile platform.

In accordance with another aspect disclosed herein, there is set forth a system for supporting imaging on a mobile platform, including:

an imaging device configured to capture a plurality of images for a substantially same scene using respective imaging configurations;

a stabilization device configured to stabilize the imaging device on the mobile platform during the capturing of the plurality of images; and a controller configured to control an operation of the mobile platform and configured to communicate with at least one of the imaging device and the stabilization device.

In accordance with another aspect disclosed herein, there is set forth an unmanned aerial vehicle (UAV), including:

an imaging device that operates to capture a plurality of images for a substantially same scene with respective imaging configurations and a gimbal coupled to the imaging device to stabilize the imaging device against a motion of the UAV.

In accordance with another aspect disclosed herein, there is set forth a method for image processing, including:

receiving a plurality of images for a substantially same scene captured using respective imaging configurations; and generating a resultant image based on the received images.

In some embodiments of the disclosed method, the receiving includes receiving the plurality of images for a same scene.

In some embodiments of the disclosed method, the receiving includes receiving the plurality of images from a stabilized imaging device.

In some embodiments of the disclosed method, the generating includes fusing the plurality of images without performing image registration.

In some embodiments of the disclosed method, the receiving includes receiving the plurality of images captured using respective bracketing configurations.

In some embodiments of the disclosed method, the receiving includes receiving the plurality of images captured using respective exposure values.

In some embodiments of the disclosed method, the generating includes generating the resultant image having a composite dynamic range greater than a dynamic range of a selected image among the plurality of images.

In some embodiments of the disclosed method, the generating includes fusing the plurality of images into the resultant image based upon respective exposure values of the plurality of images.

In some embodiments of the disclosed method, the generating includes determining a value for each pixel in the resultant image based on a weighted average of image data for corresponding pixels in the plurality of images.

In some embodiments of the disclosed method, the generating includes evaluating the image data for the corresponding pixels in the plurality of images based on a reference exposure value.

In some embodiments of the disclosed method, the method further includes storing the resultant image.

In some embodiments of the disclosed method, the storing includes storing the resultant image in a lossless manner.

In some embodiments of the disclosed method, the method further includes storing the resultant image in a raw image data format.

In some embodiments of the disclosed method, the method further includes storing the resultant image in a 32-bit floating point camera filter array data.

In some embodiments of the disclosed method, the method further includes rendering a preview image for the resultant image.

In some embodiments of the disclosed method, the rendering includes rendering the preview image for the resultant image via tone mapping.

In some embodiments of the disclosed method, the rendering includes rendering the preview image in an 8-bit image format.

In some embodiments of the disclosed method, the method further includes downsizing the resultant image before the rendering.

In some embodiments of the disclosed method, the downsizing includes downsampling the resultant image before the rendering.

In some embodiments of the disclosed method, the method further includes demosaicing the resultant image before the rendering.

In accordance with another aspect disclosed herein, there is set forth a system for image processing, including:
one or more image processors configured to:
receive a plurality of images captured for a substantially same scene using respective imaging configurations; and
generate a resultant image based on the received images.

In some embodiments of the disclosed system, the one or more image processors are configured to receive the plurality of images captured for a same scene.

In some embodiments of the disclosed system, the one or more image processors are configured to receive the plurality of images from a stabilized imaging device.

In some embodiments of the disclosed system, the one or more image processors are configured to fuse the plurality of images without performing image registration.

In some embodiments of the disclosed system, the received images are captured using respective bracketing configurations.

In some embodiments of the disclosed system, the received images are captured using respective exposure values.

In some embodiments of the disclosed system, the resultant image has a composite dynamic range that is greater than a dynamic range of a selected image among the plurality of images.

In some embodiments of the disclosed system, the one or more image processors are configured to fuse the plurality of images into the resultant image based upon respective exposure values associated with the plurality of images.

In some embodiments of the disclosed system, the one or more image processors are configured to determine a value for each pixel in the resultant image based on a weighted average of image data for corresponding pixels in the plurality of images.

In some embodiments of the disclosed system, the one or more image processors are configured to evaluate the image data for the corresponding pixels in the plurality of images based on a reference exposure value.

In some embodiments of the disclosed system, the system further includes a memory for storing the resultant image.

In some embodiments of the disclosed system, the memory is configured to store the resultant image in a lossless manner.

In some embodiments of the disclosed system, the memory is configured to store the resultant image in a raw image data format.

In some embodiments of the disclosed system, the memory is configured to store the resultant image in a 32-bit floating point camera filter array data.

In some embodiments of the disclosed system, the one or more image processors are configured to render a preview image for the resultant image.

In some embodiments of the disclosed system, the one or more image processors are configured to render the preview image for the resultant image via tone mapping.

In some embodiments of the disclosed system, the preview image is in an 8-bit image format.

In some embodiments of the disclosed system, the one or more image processors are configured to downsize the resultant image before rendering the preview image.

In some embodiments of the disclosed system, the one or more image processors are configured to downsample the resultant image before rendering the preview image.

In some embodiments of the disclosed system, the one or more image processors are configured to demosaic the resultant image before rendering the preview image.

In accordance with another aspect disclosed herein, there is set forth an imaging apparatus, including:
an imaging device; and
one or more image processors configured to:
receive, from the imaging device, a plurality of images being captured for a substantially same scene using different imaging configurations; and
generate a resultant image based on the received images.

In accordance with another aspect disclosed herein, there is set forth a computer program product including instructions for image processing.

Figure 1:
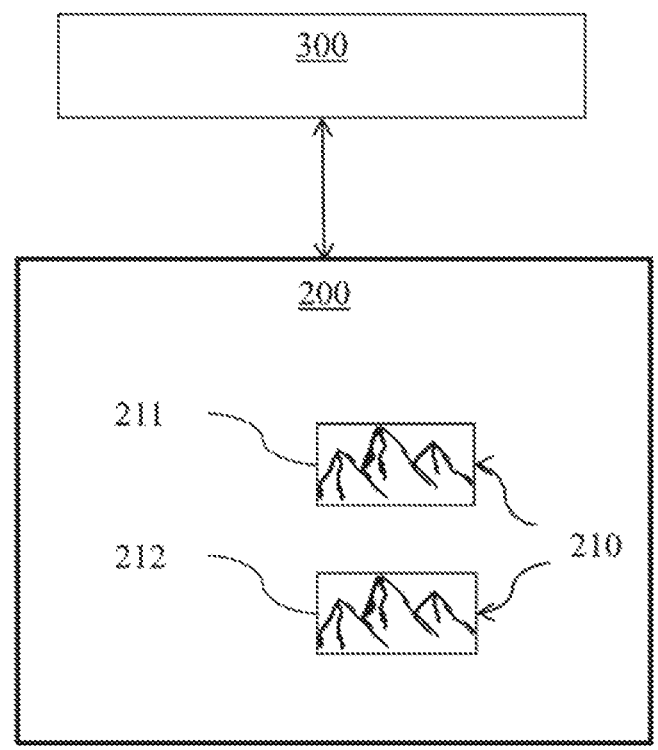
FIG. 1 is an exemplary top-level diagram illustrating an embodiment of a system for image processing.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

In photography, it may be challenging to obtain a satisfactory image for certain scenes. For a challenging scene, a camera may not be able to capture a single image to present the scene as being perceived by human eye. In one example, a scene may have a significant variation in lighting conditions. In another example, a scene may include objects at different distances from the camera.

Currently-available methods for processing images captured by an unmanned aerial vehicle (UAV) are complex and incapable of capturing high-quality images for challenging scenes. Therefore, a system and method that support imaging and/or produce high quality images using a mobile platform can prove desirable and provide a basis for a wide range of mobile platform applications, such as capturing aerial images under complex lighting conditions and fusing the aerial images into a high quality high dynamic range (HDR) image in real time. This result can be achieved, according to one embodiment disclosed herein, by a system 100 as illustrated in FIG. 1.

Turning to FIG. 1, the system 100 is shown as including an imaging device 200 for capturing a plurality of images 210. The imaging device 200 can operate to capture the plurality of images 210. Optionally, a controller (not shown) that is coupled to, and/or distal from, the imaging device 200 can direct the imaging device 200 to capture the plurality of images. An exemplary imaging device 200 can include a camera configured to capture the images 210 of a same scene. The image 210 can include a still image and/or a single static image (i.e., a still frame) of a video. The imaging device 200 can capture the plurality of images 210 using respective imaging configurations. An image configuration can include a setting of the camera for capturing the image. The imaging configurations can be uniform and/or different among the plurality of images 210. The plurality of images 210, for example, can include a first image 211 and a second image 212.

An exemplary imaging configuration can include bracketing configuration. In various situations, a satisfactory effect can be difficult to obtain with a single shot by the imaging device 200. Instead, the imaging device 200 can take the plurality of images 210 by bracketing. Bracketing can refer to capturing the plurality of images 210 of the same scene using different camera settings (or bracketing configurations). That is, by bracketing, the imaging device 200 can capture the image 210 of the same scene using respective bracketing configurations.

By bracketing, the imaging device 200 can capture the multiple images, and the multiple images can be subsequently processed to produce an image having the satisfactory effect. In certain examples, the imaging device 200 can capture the plurality of images 210 via autobracketing. Autobracketing can include automatic bracketing by using one or more setting(s) on the imaging device 200 to take several bracketed shots.

An exemplary type of bracketing can include exposure bracketing. Exposure can refer to amount of light per unit area reaching a photographic film or electronic image sensor. The exposure configuration can include setting of exposure when an image 210 is captured. An exemplary exposure configuration can include one or more parameters and/or settings associated with exposure for the image 210. The exemplary exposure configuration can include exposure value, shutter speed, lens aperture, scene luminance, or a combination thereof.

The imaging device 200 can capture images via exposure bracketing, and the images can be subsequently processed to produce an image having a dynamic range that is greater than a dynamic range of a single captured image. For example, the imaging device 200 can encounter an HDR scene, which can have a visible dynamic range that is visible to human eye but that exceeds a dynamic range that can be processed by an 8-bit digital image storage device and/or display device.

A dynamic range can include a ratio between a maximum luminance and a minimum luminance of the image, such as:

$$DR = 20\ \log_{10}\left(\frac{I_{largest}}{I_{smallest}}\right)$$

where DR is the dynamic range in decibels, and $I_{largest}$ and $I_{smallest}$ are respectively the maximum luminance and the minimum luminance of the image.

The digital image storage device and/or display device can process an 8-bit digital image, which can express a dynamic range as follows:

$$DR = 20\ \log_{10}\left(\frac{256}{1}\right) = 48.16\ dB$$

In contrast, a human eye can perceive visible light having a dynamic range as follows:

$$DR = 20\ \log_{10}\left(\frac{16384}{1}\right) = 84.29\ \mathrm{dB}$$

Using exposure bracketing can allow details in dark and bright areas of the same HDR scene to be captured, thereby reducing and/or eliminating the limitation of imaging compared with human vision.

Another exemplary type of bracketing can include flash bracketing. Flash bracketing can include capturing the images 210 in a bracketed series where an amount of light provided by a flash of the imaging device 200 can be varied for each of the images 210 in order to find the most pleasing combination of ambient light and fill flash.

Another exemplary type of bracketing can include depth-of-field (DOF) bracketing. DOF bracketing can include capturing the images 210 in a bracketed series where a shutter speed and/or an International Organization for Standardization (ISO) speed provided by the imaging device 200 can be varied for each of the images 210, in order to find the optimum of motion blur in the resultant image 203.

Another exemplary type of bracketing can include focus bracketing. Focus bracketing can include capturing the images 210 in a bracketed series where a positions of a focal plane of the imaging device 200 can be varied for each of the images 210, in order to choose one of the images 210 in which the largest portion of the scene is in focus, and/or combine in-focus portions of the images 210 digitally.

Another exemplary type of bracketing can include white balance bracketing. White balance bracketing can include capturing the images 210 in a bracketed series where a white point setting of the imaging device 200 can be varied for each of the images 210 (e.g., ranging from bluish images to reddish images), in order to capture a scene with mixed lighting.

The imaging device 200 can use other types of bracketing, such as ISO bracketing. Although in certain illustrative examples disclosed in the present disclosure, the bracketing configuration includes the exposure configuration, the images 210 can be captured using any other bracketing configurations, without limitation. Further, one or more types of bracketing can be implemented for capturing the images 210. For example, the images 210 can have respective exposure configurations, focus, and/or DOF. In other words, the images 210 can be captured using respective bracketing configurations.

FIG. 1 further illustrates the system 100 as including a stabilization device 300 coupled to the imaging device 200 for stabilizing the imaging device 200. The stabilization device 300, for example, can stabilize the imaging device 200 during the capturing of the plurality of images 210. The stabilization device 300 can stabilize the imaging device 200 against a motion that can spatially shift the imaging device 200 to cause spatial misalignment among the plurality of images 210. For example, the stabilization device 300 can be configured to reduce and/or eliminate spatial misalignment between the first image 211 and the second image 212.

Without the stabilization device 300, the imaging device 200 and/or the imaging device 200 can be subjected to vibration and/or spatial drift during operation. When the camera captures multiple still and/or video images of the same scene, the images can experience discernible spatial misalignment. When the images need to be fused to form an image, the misalignment should first be reduced by using an image registration process. The image registration process can be used for transforming spatially misaligned images into one coordinate system, so the spatial alignment between the images can be improved. Image processing can require complex calculation using a computer system. In addition, even image registration process may not completely eliminate certain misalignment. Thus, high quality of resultant images cannot be ensured.

By stabilizing the imaging device 200 and/or the imaging device 200 using the stabilization device 300, image processing can be performed without necessarily performing the image registration process. Further, high quality of resultant images can be achieved.

Figure 2:
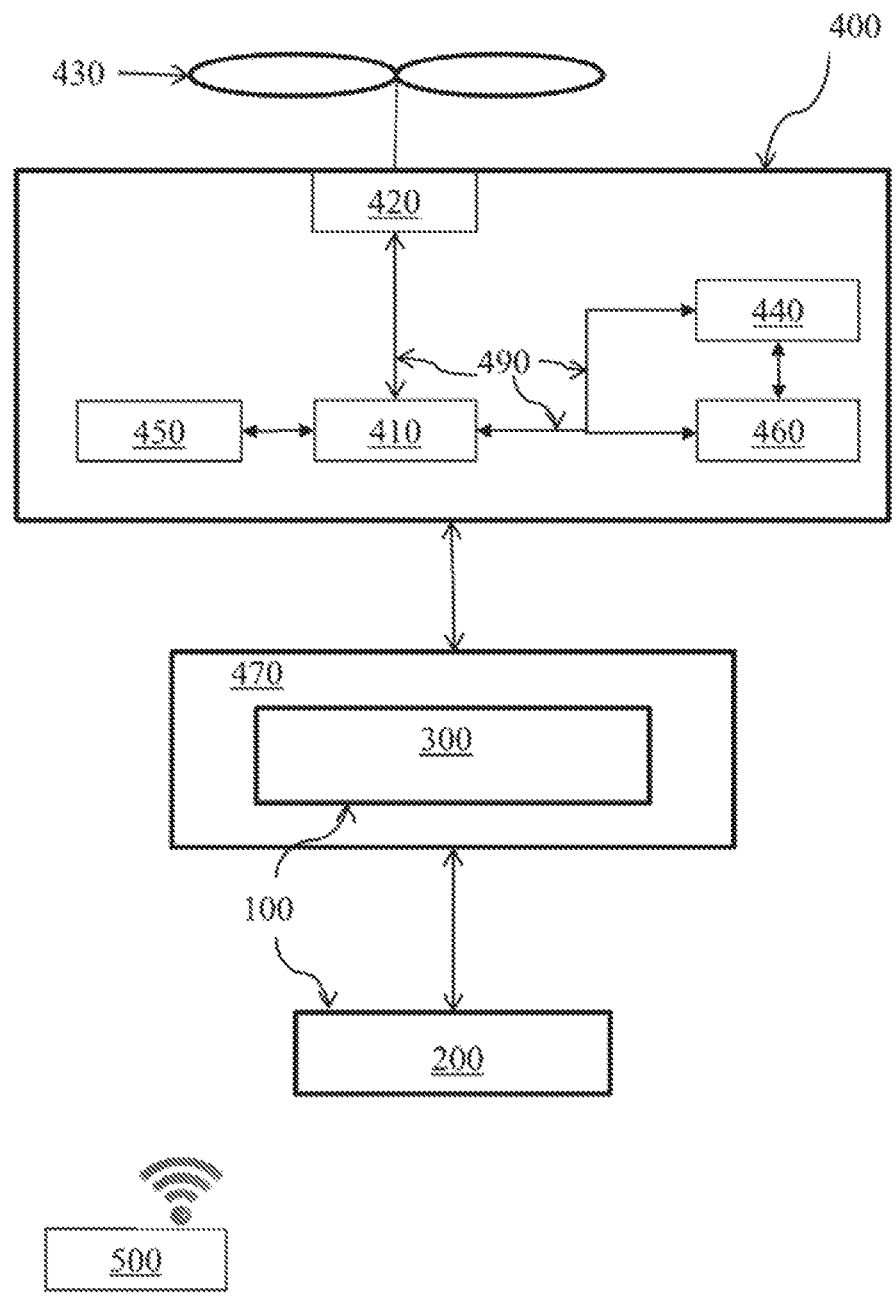
FIG. 2 is an exemplary diagram illustrating an alternative embodiment of the system of FIG. 1, wherein the system is coupled to a mobile platform.

Turning to FIG. 2, an exemplary mobile platform 400 is shown. The exemplary mobile platform 400 can include, but are not limited to, bicycles, automobiles, trucks, ships, boats, trains, helicopters, aircraft, various hybrids thereof, and the like. In some embodiments, the mobile platform is an unmanned aerial vehicle (UAV). Colloquially referred to as "drones," UAVs are aircraft without a human pilot onboard the vehicle whose flight is controlled autonomously or by a remote pilot (or sometimes both). UAVs are now finding increased usage in civilian applications involving various aerial operations, such as data-gathering or delivery. The present systems and methods are suitable for many types of UAVs including, without limitation, quadcopters (also referred to a quadrotor helicopters or quad rotors), single rotor, dual rotor, trirotor, hexarotor, and octorotor rotorcraft UAVs, fixed wing UAVs, and hybrid rotorcraft-fixed wing UAVs.

In various embodiments disclosed throughout the present disclosure, the mobile platform is described as including a UAV for purposes of illustration only. The mobile platform can include any types of mobile platform in addition to and/or alternative to the UAV, and is not limited to the UAV.

FIG. 2 shows the system 100 as being coupled with a mobile platform 400. The stabilization device 300 can be used for connecting and/or coupling the imaging device 200 to the mobile platform 400. The stabilization device 300 can stabilize the imaging device 200 against a motion of the mobile platform 400. Thus, the stabilization device 300 can be configured to stabilize the imaging device 200 against a motion of the mobile platform 400.

The mobile platform 400 can include a controller 410 configured to perform data acquisition, data processing, and any other functions and operations for controlling an operation of the mobile platform 400. The controller 410 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

For example, the controller 410 can include one or more microprocessors. The microprocessor can include a computer processor that incorporates the functions of a computer's central processing unit (CPU) on one or more integrated circuits. The microprocessor can be a multipurpose and/or programmable device that accepts digital data as input, processes the digital data according to instructions stored in a memory (not shown), and provides results as output.

Although described as including a single processor for purposes of illustration only, the controller 410 can include any suitable number of uniform and/or different processors, each of which can perform one or more uniform and/or different functions, respectively.

The mobile platform 400 can further include a memory 450 and/or a communication module 460 coupled with the controller 410 via one or more communication buses (and/or signal lines) 490. Additionally and/or alternatively, the controller 410 can communicate with the imaging device 200 and/or the stabilization device 300 via the bus 490.

Exemplary memory 450 can include, but are not limited to, random access memory (RAM), static RAM, dynamic RAM, read-only memory (ROM), programmable ROM, erasable programmable ROM, electrically erasable programmable ROM, flash memory, secure digital (SD) card, etc.). The memory 450 can be configured to store data files, and coded instructions for instructing the controller 410 to execute the coded instructions. Although described as including a single memory 450 for purposes of illustration only, the imaging device 200 can include any suitable number of uniform and/or different memories 450.

The communication module 460 can be configured to transmit data and/or control signals between the system 100, the controller 410, and/or an electronic device. An exemplary electronic device can include a remote controller 500 and/or a computer (not shown) located remotely from the mobile platform 400. For example, the communication module 460 can include a transceiver, a transmitter and/or a receiver that can include radio frequency (or RF) circuitry or any other appropriate hardware and any appropriate software instructing the hardware for receiving and/or transmitting data via a wired or wireless connection with the controller 410, and/or the electronic device.

The communication module 460 can include a digital communication interface and/or an analog communication interface. The communication module 460 can facilitate communication between the system 100 and the controller 410 over one or more external communication ports (not shown), and can also include various software components for handling data received by the transceiver and/or the external communication port.

The external communication port can include any suitable electrical and/or mechanical connectors for joining electrical devices and realize communication between the electrical devices. The external communication port can be adapted for coupling directly to other devices or indirectly over a network (e.g., the Internet, wireless LAN, etc.). An exemplary external communication port can include Universal Serial Bus (USB), FIREWIRE, printed circuit board (PCB), and/or the like.

The RF circuitry can include, but be not limited to, an antenna, at least one amplifier, a tuner, one or more oscillators, a user subscriber identity module (SIM) card, a transceiver, a coupler, LNA (i.e., Low Noise Amplifier), a duplexer, etc. In addition, the RF circuitry can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband encode Division Multiple Access), LTE (Long Term Evolution), e-mail, SMS (Short Messaging Service).

Although described as including a single communication module 460 for purposes of illustration only, the communication module 460 can include any suitable number of uniform and/or different communication modules 460.

A remote controller 500 shown in FIG. 2 can transmit an operation command to the mobile platform 400 and/or the imaging device 200. The remote controller 500 can include components such as joysticks, switches, keys or buttons, and the like, to ease usage by a human operator. Exemplary operation commands can include movement commands, e.g., moving forward or backward, sideward flying, turning left or right, elevating or descending, throttle control, accelerating or decelerating, switching gear or mode, specifying a desired position, maintaining in a hovering state, adjusting camera orientation, and/or the like. Exemplary operation commands can further include camera operations. The remote controller 500 can include a transceiver, a transmitter and/or a receiver that can include RF circuitry or any other appropriate hardware and any appropriate software instructing the hardware for receiving and/or transmitting data via a wired or wireless connection with the communication module 460.

The mobile platform 400 can further include a movement mechanism 420 configured to enable the mobile platform 400 to move according to as command by the controller 410. The movement mechanism 420 can include any machine configured to convert one form of energy into mechanical energy. The movement mechanism 420 can include, but is not limited to, one or more of rotors, propellers, blades, engines, motors, wheels, axles, magnets, nozzles, animals, and/or human beings.

In a non-limiting example, the movement mechanism 420 can include a motor (not shown). The motor can be coupled with a propulsion mechanism 430 (as shown in FIG. 2). The propulsion mechanism 430 can include any structure for creating a force leading to a movement of the mobile platform 400. For example, the propulsion mechanism 430 can include propeller(s) driven by the movement mechanism 420 to rotate and generate a thrust for propelling the mobile platform 400.

When the movement mechanism 420 includes a motor, the controller 410 can send a motor control signal to the motor. The motor control signal can instruct the motor to operate, so the mobile platform 400 can move in a predetermined direction and with a selected speed. Additionally and/or alternatively, the controller 410 can send controller instructions to a motor controller (not shown). The motor controller can generate the motor control signal based on the controller instructions. Based on the motor control signal, the movement mechanism 420 can drive the propulsion mechanism 430 for propelling the mobile platform 400 and thus enable the mobile platform 400 to move accordingly.

When the imaging device 200 is instructed to capture still and/or video images of a target object, a position of the mobile platform 400 may need to remain unchanged throughout a preselected time interval. For example, if the mobile platform 400 is an unmanned aerial vehicle (UAV), the UAV can maintain a hovering state in which the UAV suspends in air without a change of position as the imaging device 200 captures multiple images of a scene.

As shown in FIG. 2, the mobile platform 400 can include one or more sensors 440 for sensing spatial disposition, velocity, acceleration, and/or orientation of the mobile platform 400. Exemplary spatial disposition, velocity, and/or acceleration of the mobile platform 400 can be expressed with respect to a translational coordinate system and/or a rotational coordinate system. The sensor 440 can include one or more uniform and/or different sensors. An exemplary sensor 440 can include global positioning system (GPS) sensor, motion sensor, inertial sensor, proximity sensor, image sensor, gyroscope, accelerometer, angular speedometer, magnetic induction gauge, and/or compass. The sensing data provided by the sensor 440 can be used by the controller 410 for controlling the spatial disposition, velocity, acceleration, and/or orientation of the mobile platform 400. Additionally and/or alternatively, the sensor 440 can provide data regarding the environment surrounding the mobile platform 400. For example, exemplary data can include weather conditions, proximity to potential obstacles, location of geographical features, location of manmade structures, and/or the like.

In the hovering state at a desired position, the controller 410 can obtain data associated with the movement of the mobile platform 400 from the sensor 440. Upon detecting a deviation of the mobile platform 400 from the desired position, the controller 410 can instruct the movement mechanism 420 correspondingly to compensate for the deviation from the desired position. Returning to the UAV example above, when a speed of the UAV is detected to be non-zero, the controller can control the UAV to adjust the speed to be zero. In another example, when a position of the UAV is detected to have deviated from the desired position, the controller can move the UAV back to the desired position.

The mobile platform 400 does not always remain at the desired position with good stability. The movement mechanism 420 can usually be in motion during operation. The motion of the movement mechanism 420 can result in a motion of the mobile platform 400 and another system coupled to the mobile platform.

Activation of the propulsion mechanism 430 can result in a motion of the mobile platform 400. In a UAV, the rotation of the propeller(s) and/or rotors of the propulsion mechanism 430 can induce a vibration, oscillation, impact, and/or shaking of the mobile platform 400. Further, the mobile platform 400 may drift away from the desired position. The controller 410 can measure the movement of the mobile platform 400 based on data from the sensors 440 such as the GPS and/or the gyroscope. However, precision of the gyroscope can be affected by zero shift and/or temperature shift. Precision of GPS for civil applications may be limited to a meter-scale distance. Additionally and/or alternatively, calculation by the controller 410 based on the data from the sensor 440 can be associated with selected errors. Therefore, the position of the mobile platform 400 may not be stable.

If the imaging device 200 is connected to the mobile platform 400 via a rigid connection, when the mobile platform 400 moves, the motion of the mobile platform 400 transmits to the imaging device 200. Stability of the imaging device 200 can thus be significantly affected by the mobile platform 400.

In an effort to counter the effect of the mobile platform 400 on the imaging device 200, the mobile platform 400 includes the stabilization device 300 as shown in FIG. 2. The stabilization device 300 can stabilize the imaging device 200 against a motion of the mobile platform 400. The stabilization device 300 can include a stabilization mechanism for stabilizing the imaging device 200. The stabilization mechanism can refer to any hardware and/or software instructing the hardware for achieving stabilization of an object.

As shown in FIG. 2, the mobile platform 400 can include a carrier 470 for coupling the imaging device 200 to the mobile platform 400. The carrier 470 can include any mechanical and/or electrical connection that can forms a fixed and/or adjustable connection between the imaging device 200 and the mobile platform 400. The stabilization device 300 can be at least partially integrated with the carrier 470.

Figure 3:
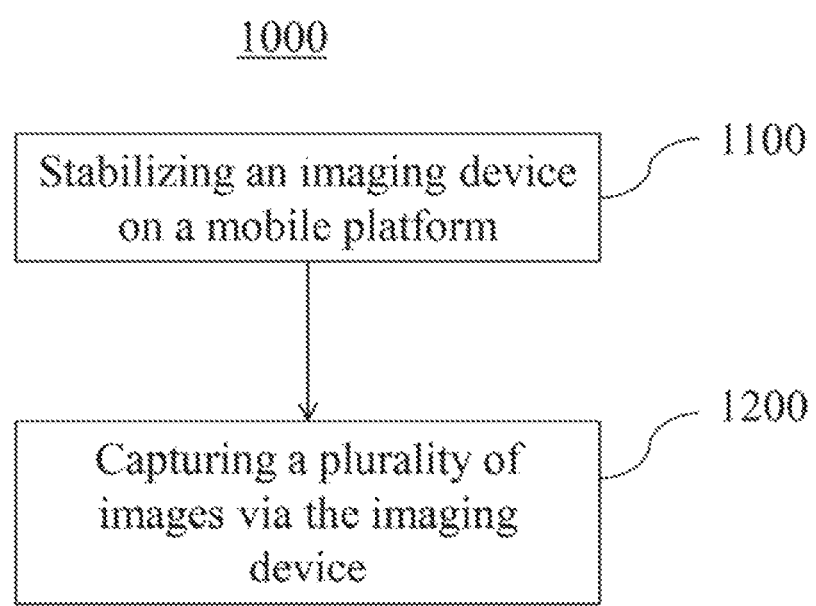
FIG. 3 is an exemplary top-level flow chart illustrating an embodiment of a method for supporting imaging using the system of FIG. 1.

Turning to FIG. 3, a method 1000 for image processing is shown. The imaging device 200 can be stabilized, at 1100, on the mobile platform 400. The mobile platform can be referred to as a movable object.

The plurality of images 210 can be captured, at 1200, with the imaging device 200. For example, the plurality of images 210 can be captured with the imaging device 200 by using the respective imaging configurations. By stabilizing the imaging device 200 using the stabilization device 300 at 1100, image processing for the captured images 210 can be performed without necessarily performing the image registration process. Further, high quality of resultant images can be achieved.

Figure 4:
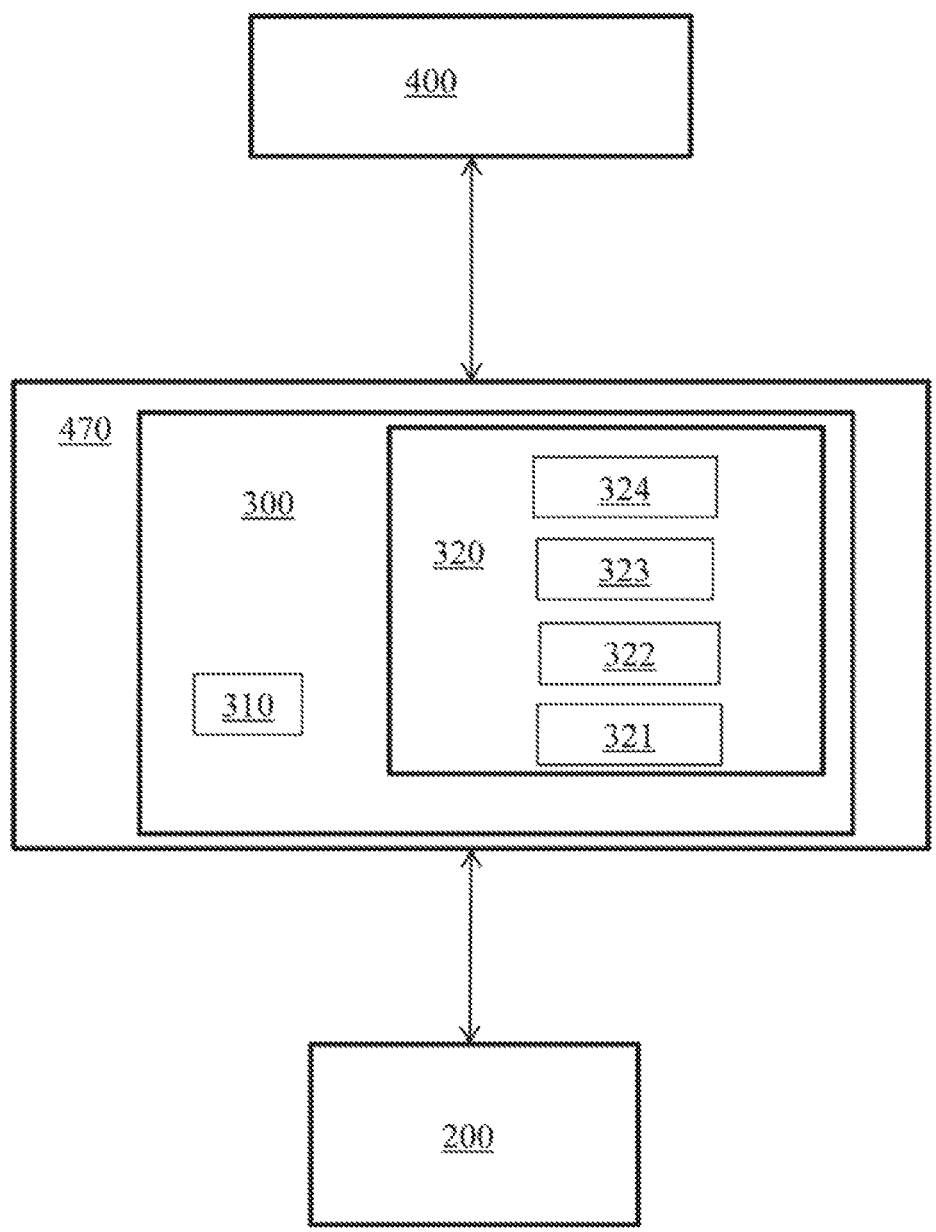
FIG. 4 is an exemplary diagram illustrating an alternative embodiment of the system of FIG. 2, wherein the system includes a stabilization device at least partially integrated with a carrier associated with the mobile platform.

FIG. 4 is an exemplary diagram illustrating an alternative embodiment of the system 100 of FIG. 1. FIG. 4 shows the stabilization device 300 as being at least partially integrated with the carrier 470 associated with the mobile platform 400. FIG. 4 shows the stabilization device 300 as including a damping unit 310 and/or a compensating unit 320. In other words, the stabilization mechanism of the stabilization device 300 can include a damping unit 310 and/or a compensating unit 320.

Figure 5:
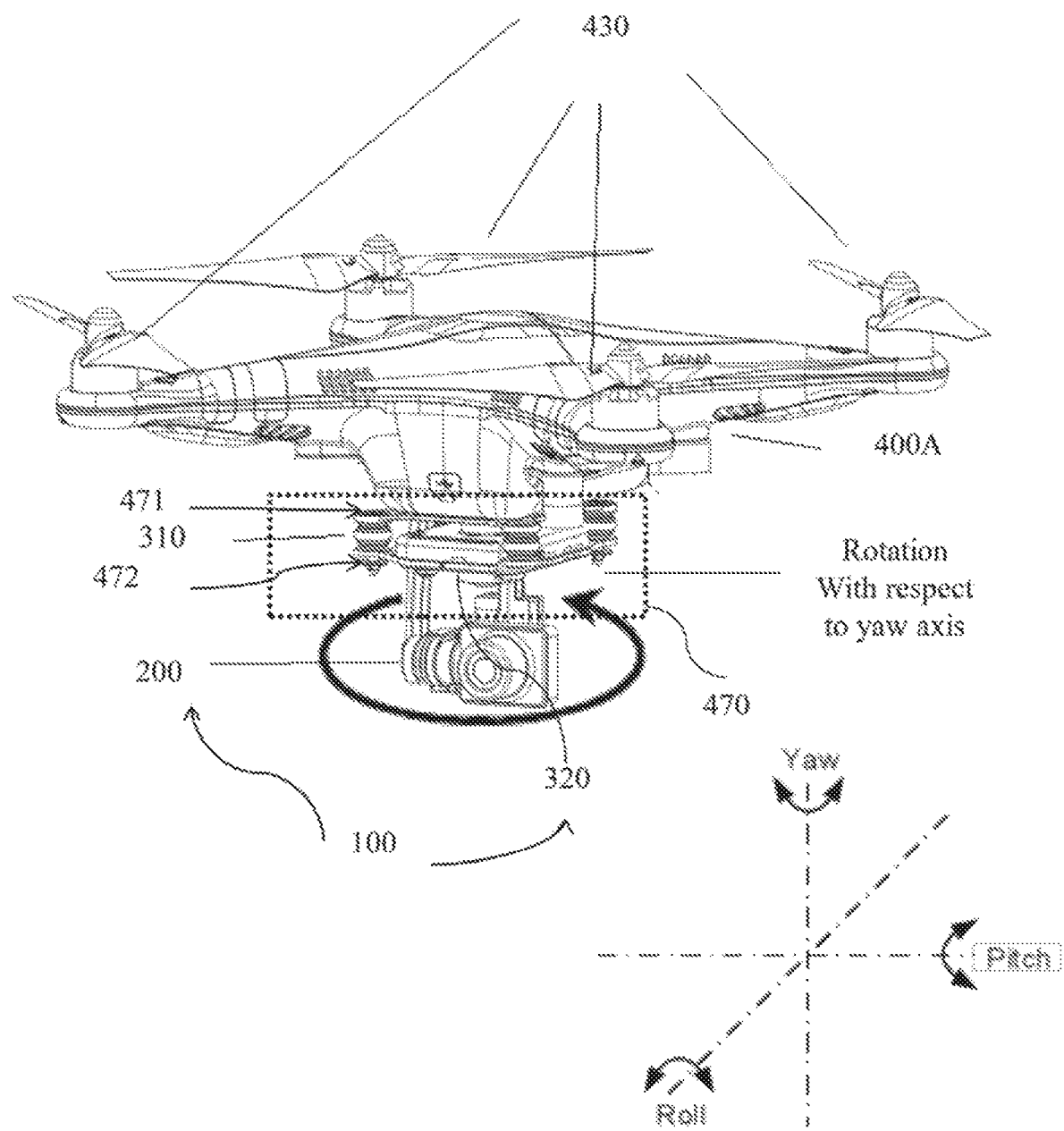
FIG. 5 is an exemplary detail drawing illustrating another alternative embodiment of the system of FIG. 1, wherein the system is coupled to an Unmanned Aerial Vehicle.

An exemplary relation between the system 100, the stabilization device 300, the carrier 470 and/or the mobile platform 400 described in FIG. 4 can be illustrated by referring to FIG. 5. FIG. 5 is an exemplary detail drawing illustrating an alternative embodiment of the system 100. As illustrated in FIG. 5, the mobile platform 400 can be provided as an unmanned aerial vehicle (or UAV) 400A. FIG. 5 shows the propulsion mechanism 430 as including propellers, which can rotate to keep the UAV 400A in a hovering state.

As shown in FIG. 4, the carrier 470 can include the damping unit 310. Accordingly, the damping unit 310 can be used for mounting the imaging device 200 and/or the imaging device 200 onto the mobile platform 400 and damp a motion to which the imaging device 200 is subjected.

The damping unit 310 can include one or more damping elements. Each damping element can include any suitable structure and/or material enabled to reduce, restrict and/or prevent the movement of the imaging device 200 and/or the carrier 470 caused by the movement of the movable object such as the mobile platform 400.

For example, the damping elements may provide motion damping by isolating the load from the source of motion and dissipating or reducing the amount of motion that the source of motion transmits to the imaging device 200. The damping elements may reduce the amplitude of the motion that can be otherwise be experienced by the imaging device 200. The motion damping applied by the damping elements may be used to stabilize the load, thereby reducing spatial misalignment between the images 210 captured by the imaging device 200, as well as reducing the computational complexity for generating a resultant image based on the plurality of captured images 210.

An exemplary damping unit 310 can be made of a material that is compressible and/or deformable of any suitable shape. The properties of the damping unit 310 can be selected so as to provide a predetermined amount of motion damping. For example, the damping unit 310 can be made of sponge, foam, rubber, gel, viscoelastic materials, piezoelectric materials and/or shape memory materials. The damping unit 310 can include one or more mechanical elements, such as springs, pistons, hydraulics, pneumatics, dashpots, shock absorbers, isolators, and the like. For example, the damping unit 310 can include one or more anti-vibration balls for coupling the gimbal with the mobile platform 400. The anti-vibration balls can be made of a viscoelastic material such as rubber, and thus can function as a damper to stabilize the imaging device 200 against the vibration of the mobile platform 400.

The damping unit 310 can include one or more damping elements of uniform and/or different types. The damping unit 310 can be coupled to one or more portions of the imaging device 200. For instance, the damping unit 310 may be located near a contact point, a coupling point, and/or a surface between the load and the mobile platform 400. In some instances, the imaging device 200 can be embedded within and/or enclosed by the damping unit 310.

In the example shown in FIG. 5, the damping unit 310 can include the anti-vibration balls fixedly and/or adjustably positioned between a top carrier platform 471 and a bottom carrier platform 472. The top carrier platform 471 can be fixedly and/or adjustably coupled to the UAV 400A. The bottom carrier platform 472 can be fixedly and/or adjustably coupled to the imaging device 200, and/or the imaging device 200. A motion of the top carrier platform 471 can be reduced by the anti-vibration balls before transferring to the bottom carrier platform 472. Therefore, the anti-vibration balls can function as a non-rigid junction between the carrier and UAV 400A, which can damp motion of the UAV 400A to reduce the motion transferred to the imaging device 200.

As shown in FIG. 4, the stabilization mechanism can further include a compensating unit 320. The compensating unit 320 can be configured to compensate for the motion to which the imaging device 200 is subjected. In other words, when the imaging device 200 deviates from a desired position, the compensating unit 320 can enable the imaging device 200 to be restored to the desired position.

The compensating unit 320 can include a carrier controller 321, one or more actuator members 323 operated according to instructions from the carrier controller 321, one or more carrier sensors 322 for collecting data of the actuator members 323, and/or a frame assembly 324 that can be controlled by the actuator members 323.

The frame assembly 324 can permit the imaging device 200 to rotate about one or more axes. Exemplary axes can include X or pitch axis, Z or roll axis, and Y or yaw axis, relative to the mobile platform 400. The frame assembly 324 can include one or more frame members. For example, a frame member can be configured to be coupled with and support the imaging device 200. The one or more actuator members 323 can control the frame assembly 324. An exemplary actuator member 323 can include a motor.

The one or more carrier sensors 322 can determine a status of the carrier 470 and/or the imaging device 200 carried by the carrier 470. Exemplary status can include a position, a velocity (e.g., linear or angular velocity), and/or an acceleration (e.g., linear or angular acceleration) about the carrier 470 and/or the imaging device 200. The status as acquired and/or calculated from the sensor data may be used as feedback data to control the rotation of the frame members. Exemplary carrier sensors 322 may include motion sensors (e.g., accelerometers), rotation sensors (e.g., gyroscope), inertial sensors, gyroscopes, GPS sensors, angular speedometers, magnetic induction gauges, and/or compasses.

The carrier sensors 322 can be coupled to the carrier 470 (e.g., frame assembly 324 and/or actuator members 323). Additionally or alternatively, the carrier sensors 322 may be at least partially coupled to the imaging device 200 carried by the carrier 470.

The carrier sensors 322 may be coupled with some or all of the actuator members 323 and measure the driving of the respective actuator members 323. In certain examples, the carrier sensors 322 can include potentiometers that are inserted on a motor shaft of a motor to measure the relative position of a motor rotor and motor stator, thereby measuring the relative position of the rotor and stator. The carrier sensors 322 can provide a positional signal for the corresponding actuator member 323 that the sensor measures.

The carrier sensors 322 can provide position and/or orientation data that may be transmitted to a carrier controller 321 on the carrier 470 and/or the controller 410 (shown in FIG. 2) on the mobile platform 400. The carrier controller 321 can include one or more processors for processing data provided by the carrier sensors 322. The sensor data can be used in a feedback-based control scheme for controlling the driving of the one or more actuator members 323. The carrier controller 321 and/or the controller 410 can generate control signals for driving the actuator members 323 based on data received from the carrier sensors 322 indicative of the spatial disposition of the carrier 470 and/or the imaging device 200. Advantageously, the control scheme can be used to provide feedback control for driving actuator members 323 of the carrier 470, thereby enabling more precise and accurate rotation of the imaging device 200.

The carrier 470 can couple the imaging device 200 with the mobile platform 400 and the precisely controlling accurate rotation of the imaging device 200. According to the present disclosure, the carrier controller 321, the actuator members 323, the carrier sensors 322, and/or the frame assembly 324 can constitute the compensating unit 320 (as shown) to compensate for a motion of the imaging device 200 based on the motion at least detected by the carrier sensors 322. Thereby, the imaging device 200 can be stabilized while capturing the images 210.

In an illustrative example, the frame assembly 324 can include a gimbal (not shown) for coupling the imaging device 200 with the mobile platform 400. The gimbal can have a gyroscope structure configured to rotate the imaging device 200 to change a yaw angle, pitch angle and/or roll angle of the imaging device 200 according to control signals from the carrier controller 321. Thus, the imaging device 200 can be adjustably positioned to capture images in a wide range of directions.

Based on data collected by the carrier sensors 322, the carrier controller 321 can determine the movement, position, and/or direction of the gimbal. The movement, position, and/or direction of the gimbal can represent movement, position, and/or direction of the imaging device 200 because the imaging device 200 is mounted on the gimbal. The carrier controller 321 can be pre-programmed to detect deviation of the imaging device 200 from a desired position according data from the carrier sensors 322. The carrier controller 321 can thus calculate an amount and a direction for moving the gimbal to help ensure the imaging device 200 remains in the desired position. The carrier controller 321 can thus enable the actuator members 323 to move the frame assembly 324 according to the calculated amount and direction.

Optionally, the controller 410 can obtain data associated with the position and/or movement of the mobile platform 400 from one or more of the sensors 440 and transmit the data to the carrier controller 321 using wired and/or wireless communication. The carrier controller 321 can be configured to use the data from the controller 410 for correcting result of data from the carrier sensors 322 to improve accuracy of measurement of the movement, direction, and/or position of the imaging device 200.

For example, the sensors 440 may sense that the mobile platform 400 has experienced a change in yaw angle. The carrier sensors 322 may sense that the gimbal has experienced a change in yaw angle consistent with data from the sensors 440. Thus, data generated by the sensors 440 can be received by the controller 410. The controller 410 can send the data generated by the sensors 440 to the carrier controller 321. The carrier controller 321 can use the data generated by the sensors 440 for validating and/or correcting the data received from the carrier sensors 322. Additionally and/or alternatively, the data from the sensors 440 can be combined with the data from the carrier sensors 322 to improve accuracy of measuring the movement of the gimbal. For example, an averaged and/or weighted average for respective pitch data from the sensors 440 and the carrier sensors 322 can be calculated to obtain more accurate pitch data. In another example, the data from the sensors 440 can be combined with the data from the carrier sensors 322 via one or more selected sensor data combination technique. Exemplary techniques include Central Limit Theorem, Kalman filter, Bayesian networks, and/or Dempster-Shafer theory.

As illustratively shown in FIG. 5, the stabilization device 300 can include the compensating unit 320 functioning as a gimbal. The imaging device 200 can be mounted on the gimbal. The gimbal can coupled to the UAV 400A via the damping unit 310. The damping unit 310 is shown in FIG. 5 as including four anti-vibration balls. Although four anti-vibration balls are shown, the damping unit 310 can comprise any type of damping unit 310 as discussed above with reference to FIG. 2 and/or can include any suitable number of anti-vibration balls.

As shown in FIG. 5, the carrier 470 can enable the imaging device 200 to rotate. The carrier 470 can enable the imaging device 200 to rotate with respect to a roll axis, a pitch axis, and/or a yaw axis (shown in FIG. 5) for compensating for the vibration of the UAV 400A.

For illustrative purposes, FIG. 5 shows the imaging device 200 as rotating with respect to the yaw axis. In certain embodiments, the carrier 470 can enable the imaging device 200 to rotate with respect to the yaw axis at a constant and/or variable speed. The compensating unit 320 can compensate for movement of the imaging device 200 with respect to the pitch axis, and/or the roll axis. Additionally and/or alternatively, the compensating unit 320 can compensate for movement of the imaging device 200 with respect to the pitch axis, yaw axis, and/or the roll axis to keep the imaging device 200 stabilized.

Therefore, at least one of the stabilization device 300 and the imaging device 200 can communicate with the mobile platform 400 and/or the controller 410. As described above, the stabilization device 300 can accurately stabilize the imaging device 200 by receiving data from the sensor 440 via the controller 410. Additionally and/or alternatively, the imaging device 200 may receive instructions from the controller 410 for capturing the images 210.

In certain embodiments, the propellers of the propulsion mechanism 430 can rotate at a selected frequency. For example, the selected rotation frequency can range from 50 Hz to 200 Hz. An exemplary frequency of rotation of the propellers can be 100 Hz. Vibration generated by the rotation of the propellers can be transferred to the carrier 470 (and/or the gimbal) after being partially removed, for example, by the anti-vibration balls. Remaining vibration transferred to the carrier 470 (and/or the gimbal) can be detected by the carrier sensors 322, such as the gyroscope. The compensating unit 320 can be configured to compensate vibration motion at a predetermined frequency, ranging from 500 Hz to 2000 Hz. An exemplary compensating unit 320 can be configured to compensate vibration motion at a predetermined frequency of 1000 Hz. Therefore, after being at least partially compensated by the compensating unit 320, the resultant vibration of the imaging device 200 can be negligible.

For example, without the damping unit 310 and/or the compensating unit 320, images 210 taken at a hovering state of the mobile platform 400 can have a spatial misalignment greater than a misalignment threshold. With the damping unit 310 and/or the compensating unit 320, images 210 taken at a hovering state of the mobile platform 400 can have a spatial misalignment below the misalignment threshold. Specific value misalignment threshold can depend on design of the mobile platform 400, the damping unit 310 and/or the compensating unit 320. An exemplary misalignment threshold can range from 50 microns to 300 microns and/or can range from 0.5 pixel size to 2 pixel sizes.

Therefore, when the mobile platform 400 is at a hovering state at a desired position, the imaging device 200 of the imaging device 200 can capture multiple still and/or video images 210 of the same scene. The spatial misalignment among the images 210 can be negligible.

A camera mounted on a mobile platform can be subjected to vibration and/or spatial drift of the mobile platform. When the camera captures multiple still and/or video images of the same scene, the images can experience discernible spatial misalignment. When the images need to be fused to form an image, the misalignment should first be reduced by using an image registration process.

The image registration process requires complex computer programs and processor capability, which significantly limits flexibility and efficiency of image processing. Even with complex computer programs and processor capability, the image registration process may not be able to achieve desired alignment between the images. Thus, image defects, such as ghosting phenomenon, may easily occur. Therefore, when an image registration process is necessary, image processing can be complex and cannot ensure high quality of resultant images.

In a non-limiting example, the imaging device 200 can capture multiple still and/or video images to be used for generating an HDR image.

If the disclosed system 100 is not used, when a UAV is directed to capture an HDR image, a camera mounted on the UAV can capture multiple images of the same scene at different exposure values, respectively. Due to complexity of the image registration process, a built-in processor on a UAV and/or on a camera does not have sufficient computation capability for performing the image registration process, especially when the images are of high resolution. Thus, the images need to be sent wirelessly to a computer on land, or transferred to the computer after the UAV lands on ground, to be processed by the computer which needs to have the image registration capability. After the image registration process, the images are then fused into a resultant image having a high dynamic range. Such a process can be slow and inconvenient.

Without the disclosed system 100, an HDR image cannot be produced in real time, a photographer may not be able to review image quality of the HDR image and determine optimal action for capturing further images based on the previously-taken HDR image. As a result, the photographer may miss the optimal moment for capturing the images.

Figure 6:
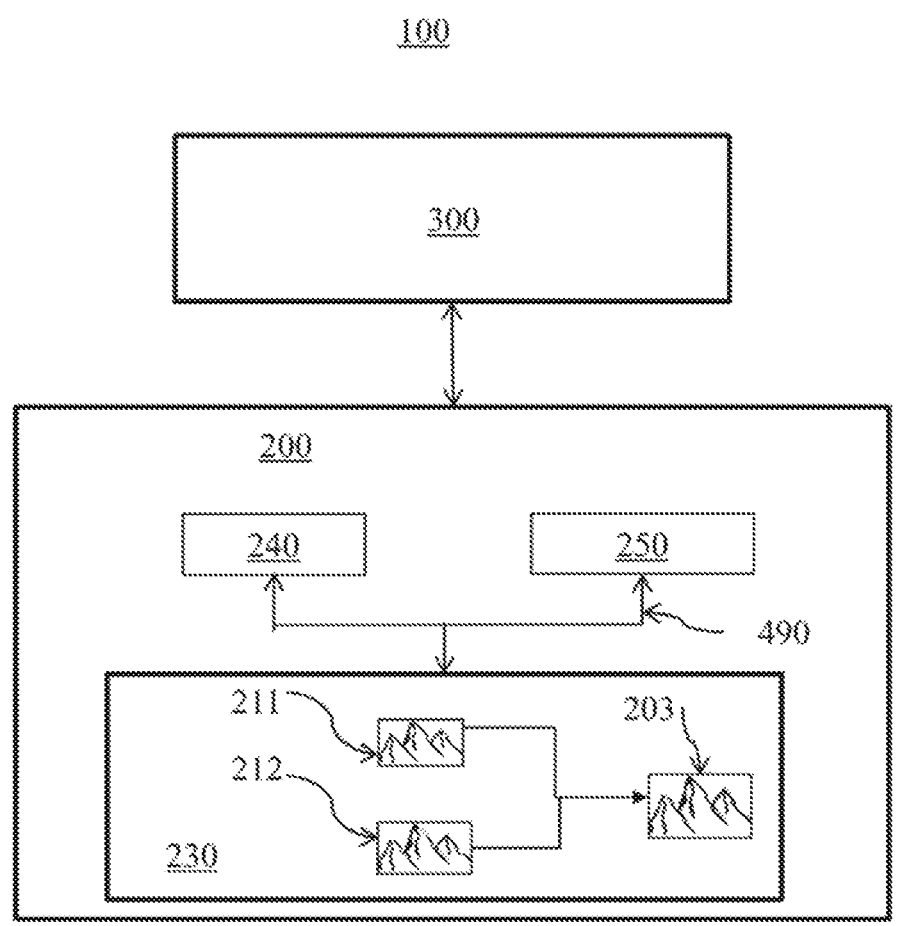
FIG. 6 is an exemplary diagram illustrating an alternative embodiment of the system of FIG. 1, wherein the system includes an imaging device.

FIG. 6 is an exemplary diagram illustrating an alternative embodiment of the system 100 of FIG. 1. The system 100 can include the imaging device 200. The imaging device 200 of FIG. 6 can include a processor 230 (or image processor 230) for generating a resultant image based on the plurality of images 210 captured using the respective imaging configurations. For example, the one or more processors 230 can be configured to fuse the plurality of images 210 captured using the respective exposure configurations into a resultant image 203. The resultant image 203 can contain information from one or more of the captured images 210.

Although FIG. 6 illustrates the processor 230 as being located on the imaging device 200, the processor 230 can be at least partially separate from the imaging device 200 and located remotely. For example, the processor 230 can be located on the mobile platform 400.

The processor 230 can include application-specific integrated circuits, application-specific instruction-set processors, graphics processing units, physics processing units, digital signal processing units, coprocessors, network processing units, audio processing units, encryption processing units, and the like. Although described as including a single processor 230 for purposes of illustration only, the imaging device 200 can include any suitable number of uniform and/or different processors 230, each of which can perform one or more uniform and/or different functions, respectively.

The processors 230 can be configured to fuse the images 210 into a resultant image 203. Because of the stabilization device 300, the spatial misalignment among the images 210 can be negligible, so the image registration process can be omitted. That is, in some embodiments, the images 210 can be fused into the resultant image 203 without the image registration process. Therefore, amount of computation for image processing can be significantly reduced. The processors 230 of the imaging device 200 mounted on the mobile platform 400 can implement the image processing in real time of capturing the images 210.

Even if generating of the resultant image 203 can include an image registration process, the image registration process can be optional and not essential. The image registration process, if used, can be used for a portion of a selected image 210 instead of being applied to an entire image. For example, a panoramic image can have the resultant image 203 as a first segment and a different image as a second segment, the image registration process can be used for stitching the first and second segments in a region of overlap therebetween. However, for generating the resultant image 203 as the first segment, the image registration process is not necessary, because a same pixel can capture the same object in each of the images 210 for fusing the image 203.

Additionally and/or alternatively, as shown in FIG. 6, the imaging device 200 can further include a memory 240 and/or a communication module 250 coupled with the processors 230.

Exemplary memory 240 can include, but are not limited to, random access memory (RAM), static RAM, dynamic RAM, read-only memory (ROM), programmable ROM, erasable programmable ROM, electrically erasable programmable ROM, flash memory, secure digital (SD) card, etc.). The memories 240 can be configured to store data files, and coded instructions for instructing the processor(s) 230 to execute the coded instructions. Although described as including a single memory 240 for purposes of illustration only, the imaging device 200 can include any suitable number of uniform and/or different memories 240.

The communication module 250 can be configured to transmit data and/or control signals between the processor 230, the controller 410, and/or an electronic device located remotely from the mobile platform 400. For example, the communication module 250 can include a transceiver, a transmitter and/or a receiver that can include radio frequency (or RF) circuitry. Although described as including a single communication module 250 for purposes of illustration only, the communication module 250 can include any suitable number of uniform and/or different communication modules 250.

Figure 7:
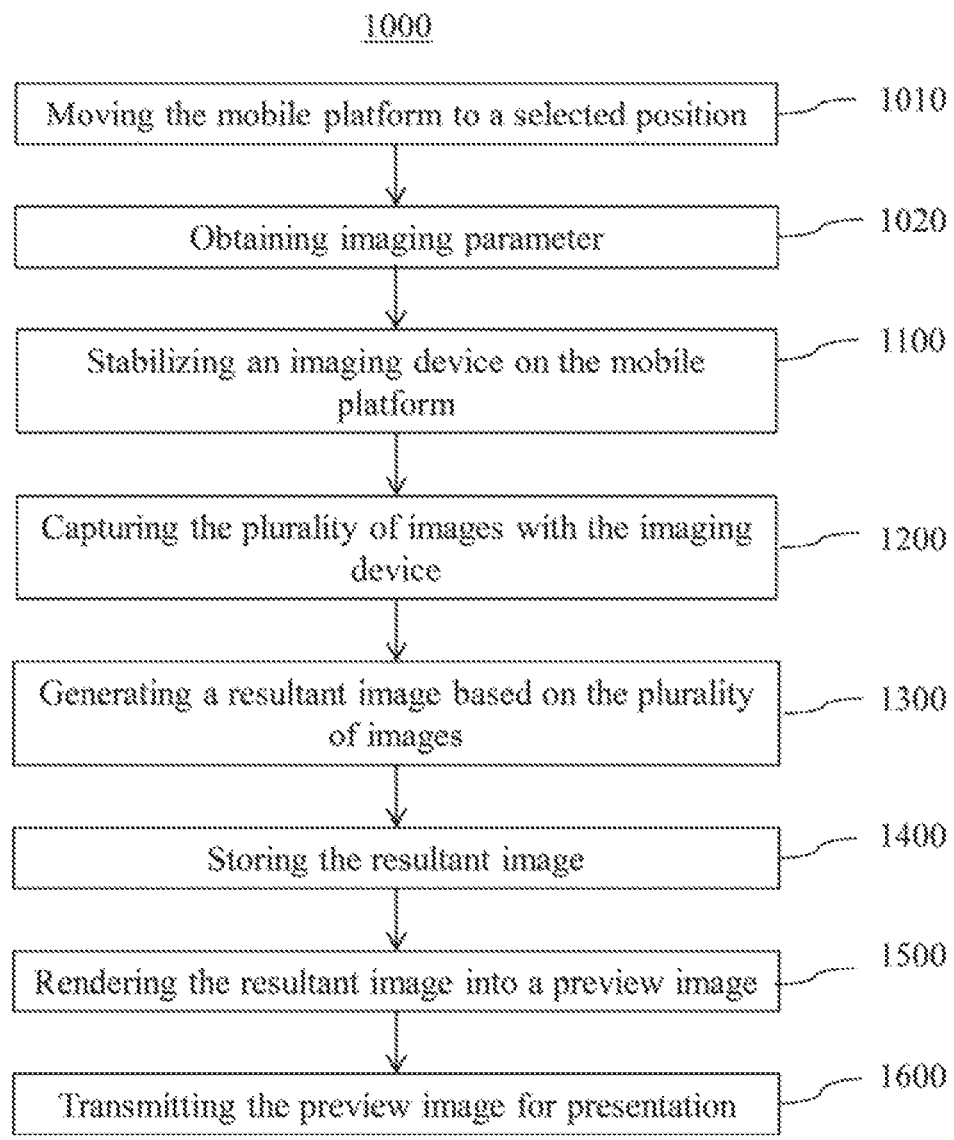
FIG. 7 is an exemplary flow chart illustrating an alternative embodiment of the method of FIG. 3, wherein the system captures a plurality of images at a selected position.

FIG. 7 is an exemplary flow chart illustrating an alternative embodiment of the method of FIG. 3 for image processing. As shown in FIG. 7, the mobile platform 400 (shown in FIG. 2) can move or be moved, at 1010, to a selected position at a predetermined geographical location. The mobile platform 400 can autonomously move to the selected position, or be moved to the selected position via any other mechanisms. For example, the mobile platform 400 can include a UAV. The controller 410 (shown in FIG. 2) can receive an operating command from the remote controller 500 (shown in FIG. 2) via the communication module 460 (shown in FIG. 2). The operation command can request the mobile platform 400 be moved to the selected position and remain in a hovering (or suspending) state at the selected position. The selected position can include a selected location and/or a selected altitude, and/or a selected orientation of the imaging device 200. The controller 410 can enable the mobile platform 400 to move according to the operation command.

An imaging parameter can be obtained, at 1020. The processor(s) 230 of the imaging device 200 can receive the operating command from the remote controller 500 (and/or another electronic device remote from the mobile platform 400) via the communication module 250. The operating command can include the imaging parameter. Additionally and/or alternatively, the controller 410 can receive the operating command and transmit the same to the processor(s) 230 of the imaging device 200.

The imaging parameter can include one or more parameters for selecting imaging configurations for capturing the images 210 (shown in FIG. 6) and/or processing the images 210 (and/or the resultant image 203) after the capturing.

The imaging parameter can include bracketing parameters corresponding to the bracketing technique used by the imaging device 200. Based on the bracketing parameters, the images 210 can be captured using respective bracketing configurations.

For example, for exposure bracketing, the bracketing parameter can include parameter(s) associated with exposure configurations. Exemplary parameters can include exposure value difference $\Delta E$. The images 210 can be captured using respective bracketing configurations and, in this case, the bracketing configuration can include the exposure configuration.

In another example, for focus bracketing, the bracketing parameter can include position(s) of the focal plane of the imaging device 200. The images 210 can be captured using respective bracketing configurations and, in this case, the bracketing configuration can include the focus configuration.

One or more types of bracketing can be implemented individually and/or collectively for capturing the images 210. For example, the images 210 can be captured with respective bracketing configurations corresponding to one or more bracketing techniques. For example, the images 210 can be captured using respective exposure, focus, and/or DOF configurations.

An image 203 generated based on the images 210 that can have improved effects in comparison with an individual image of the images 210. Based on the type of bracketing techniques, exemplary improved effects can include, but are not limited to, a greater dynamic range (exposure bracketing), a more pleasing combination of ambient light and fill flash (by using flash bracketing), a greater image focus (focus bracketing), and/or a more correct white balance (by using white balance bracketing).

For example, the images 210 can be subsequently fused into the resultant image 203 (shown in FIG. 6) that, for example, can be an HDR image. In that case, the imaging parameter can include adjustable parameter(s) for capturing the images 210 and/or fusing the images 210 into the HDR image.

For example, to obtain an HDR image, the imaging device 200 can capture multiple images 210 of the same scene by using respective exposure configurations. As previously described, an exemplary exposure configuration can include one or more parameters and/or settings associated with exposure for an image 210. Exposure can be computed from, and/or expressed by exposure value (EV). Thus, an exposure configuration may correlate with an exposure value. The imaging device 200 can capture the plurality of images 210 of the same scene at respective exposure configurations. Thus, the plurality of images 210 can be associated with respective exposure values.

The multiple images 210 can be fused into the resultant image 203 having a composite dynamic range DR greater than a dynamic range DR of a selected image among the plurality of images 210. In certain examples, the multiple images 210 can be fused into the resultant image 203 having a composite dynamic range DR greater than the dynamic range DR of each of the plurality of images 210.

Additionally and/or alternatively, the imaging parameter can include a selected number N of the plurality of images 210 and the respective exposure values. An exemplary number N can be greater than or equal to 2.

For the imaging device 200, the exposure configurations and/or exposure values (EVs) can be selected by setting an exposure value difference ($\Delta E$). For example, $\Delta E=1$ (or "an exposure step" and/or "a stop") indicates exposure value EV increasing by 1, and represents a doubling of the amount of light. Conversely, exposure value EV decreasing by 1 represents a halving of the amount of light. To reveal detail in a dark shadow may require a high exposure value EV. Conversely, to prevent "bleaching out" of detail in a bright area may require a low exposure value EV. When the imaging device 200 is not able to provide a great range of exposure values within a single exposure, the imaging device 200 can capture multiple images 210.

Thus, the imaging parameter can include a value of the exposure value difference $\Delta E$. An exemplary exposure value difference $\Delta E$ can be 0.7, 1, 2, and/or the like. Based on the exposure value difference $\Delta E$, the imaging device 200 can select the exposure configurations for capturing the multiple images 210.

As shown in FIG. 7, the imaging device 200 can be stabilized, at 1100, for capturing the plurality of images 210. Upon receiving an image-capture instruction, the imaging device 200 can be stabilized for capturing the plurality of images 210. The imaging device 200 can receive the image-capture instruction from the remote controller 500. Additionally and/or alternatively, the controller 410 can receive the operating command and transmit the same to the processor(s) 230 of the imaging device 200. The image-capture instruction can include an instruction for the imaging device 200 to start capturing the images 210. Upon receiving the image-capture instruction, the controller 410 can instruct the stabilization device 300 to compensate for the motion of the imaging device 200 for stabilizing the imaging device 200.

The plurality of images 210 can be captured, at 1200, with the imaging device 200. The imaging device 200 can capture the images 210 according to the imaging parameter. In certain embodiments, the imaging device 200 can capture the images 210 sequentially. In other embodiments, the imaging device 200 can include multiple imaging devices (not shown) for capturing at least two of the images 210 simultaneously. For example, the plurality of images 210 can be captured via autobracketing.

Optionally, after the plurality of images 210 are captured by the imaging device 200 that is stabilized, the processor 230 can receive the plurality of images 210. For example, the processor 230 can be coupled with the imaging device 200 via the bus 490 (shown in FIG. 2) and can receive the plurality of images 210 from the imaging device 200 via the bus 490. Additionally and/or alternatively, the processor 230 can receive the plurality of images 210 from the imaging device 200 via the communication module 250 (shown in FIG. 2). Additionally and/or alternatively, the processor 230 can be integrated with the imaging device 200 and can obtain the plurality of images 210 upon capturing the images 210.

A resultant image 203 (shown in FIG. 6) is generated, at 1300, based on the plurality of images 210 based on the imaging parameters. For example, the plurality of images 210 can be fused into a resultant image 203 based on the respective exposure configurations. As previously described, the images 210 can be fused into the resultant image 203 without the image registration process because the stabilization device 300 can cause the spatial misalignment among the images 210 to be negligible.

For example, each of the captured images 210 and the resultant image 203 can be in a raw format, such as a color filter array (CFA) format. A CFA (or color filter mosaic (CFM)) can refer to a mosaic of color filters placed over an image sensor of the imaging device 200 to capture color information. Each of the images 210 in CFA format can include a respective pixel value for each color filter among the CFA. An exemplary CFA configuration is a Bayer filter. The Bayer filter can have alternating red (R) and green (G) filters for odd rows and alternating green (G) and blue (B) filters for even rows.

Figure 8:
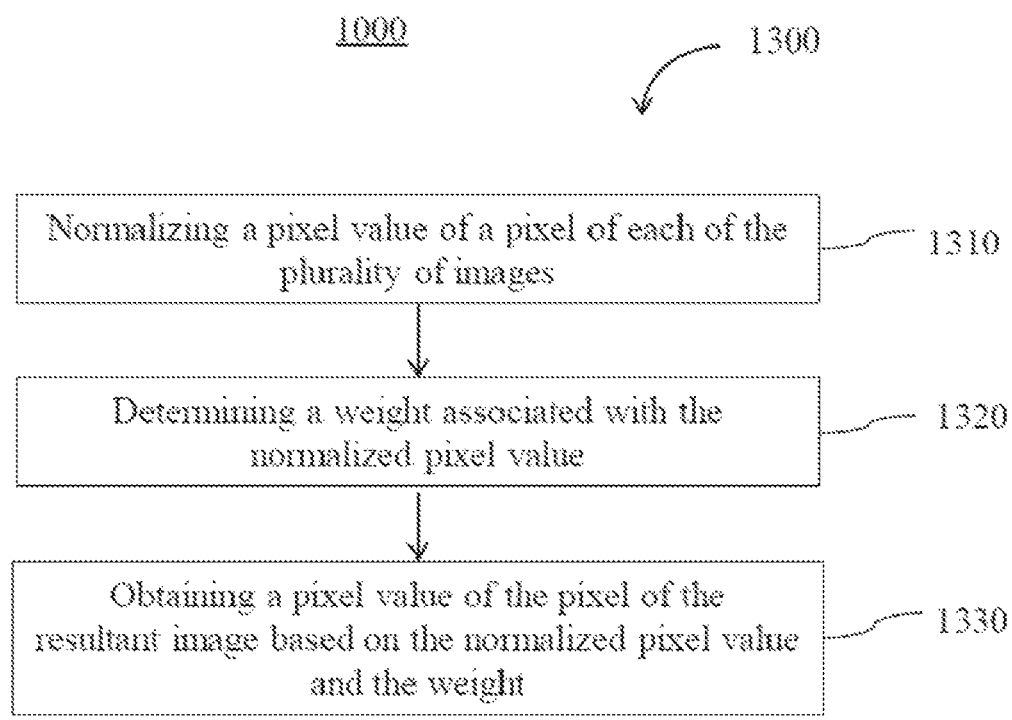
FIG. 8 is an exemplary flow chart illustrating an alternative embodiment of a method of FIG. 7, wherein a plurality of images is fused into a resultant image.

Fusing the plurality of images 210 into the resultant image 203 can include calculating a pixel value for each pixel of the resultant image 203 based on respective pixel values of the pixel in the images 210. Methods for fusing the plurality of images 210 are not limited in the present disclosure. Exemplary embodiments of the method are illustrated in FIG. 8.

The plurality of images 210 can be fused into the resultant image 203. In certain examples, the resultant image 203 can have a composite dynamic range DR greater than at least one selected image among the plurality of images 210. Further, although described as being fused into an HDR image for purposes of illustration only, the plurality of images 210 can be fused into the resultant image 203 that can have additional and/or alternative improved effects in comparison with an individual image of the plurality of images 210, based on the bracketing technique used at 1200.

The resultant image 203 can be stored, at 1400. For example, the resultant image 203 can be stored on the memory 240 (shown in FIG. 6) and/or the memory 450 (shown in FIG. 2). Optionally, the resultant image 203 can be compressed prior to being stored. The resultant image 203 can be compressed and stored in a lossless manner. That is, original data of the image 203 can be fully reconstructed from the compressed and/or stored data.

To store the resultant image 203 in a lossless manner, the resultant image 203 can be stored and/or compressed using a lossless image file format. Exemplary lossless image file formats and/or compression standard can include Inter-Leaved BitMap (ILBM), JBIG2 (developed by the Joint Bi-level Image Experts Group), WebP (developed by Google, Mountain View, Calif., USA), Lossless JPEG (JPEG-LS, developed by Joint Photographic Experts Group (JPEG)), JPEG 2000, JPEG extended range (JPEG XR), Progressive Graphics File (PGF), Portable Network Graphics (PNG), Tagged Image File Format (TIFF), Gifsicle, Optimized jpeg files (Jpegoptim), Open Compressed Triangle Mesh file format (OpenCTM), and/or Digital Negative (DNG).

Additionally and/or alternatively, the resultant image 203 can be compressed and/or stored in a raw image format. That is, a raw file of the resultant image 203 can be stored. The raw file can contain minimally processed full-resolution data from each of the image pixels of the resultant image 203. The raw files are not yet processed and are not necessarily ready to be printed or edited with a common graphic editor such as bitmap graphics editor. An exemplary raw image format can include a 12-bit image format or a 14-bit image format.

Additionally and/or alternatively, the exemplary raw image format can include a 32-bit floating point image format. Advantageously, the resultant image 203 stored in the 32-bit floating point format can have a high resolution and rich amount of information content. The stored resultant image 203 can be subsequently processed by users, such as photographers and/or graphic artists, who desire to generate high quality images with great creativity.

The 32-bit floating point image format can refer to an image file conforming to a 32-bit floating point format. Stated somewhat differently, the imaging device 200 can be configured to store the resultant image 203 as 32-bit floating point CFA data in the memory 240 and/or the memory 450. In certain embodiments, a pixel value for each color filter among the CFA can be represented by a 32-bit floating point number.

The 32-bit floating point format can conform to Institute of Electrical and Electronics Engineers (IEEE) Standard for Floating-Point Arithmetic (IEEE 754), which is a technical standard for floating-point computation. The 32-bit floating point format can also be referred to as IEEE 754 single-precision binary floating-point format. According to IEEE 754, a pixel value of each image sensor pixel can be represented by 32 bits. The 32 bits can include a sign bit (1 bit), an exponent width (8 bits) and a significand precision (23 bits).

A real value assumed by a given 32-bit (and/or binary32) data with a given biased exponent e, the 8-bit exponent width (i.e., the 8-bit unsigned integer), and a 23-bit significand is:

$$\text{value} = (-1)^{sign}(1 \cdot b_{22}b_{21} \ldots b_0)_2 \times 2^{(e-127)} \quad \text{Equation (1)}$$

or $$\text{value} = (-1)^{sign}(1 + \Sigma_{i=1}^{23} b_{23-i} 2^{-i}) \times 2^{(e-127)} \quad \text{Equation (2)}$$

where $b_{22}, b_{21}, \ldots b_0$ is a binary value of the 22rd, 21st 0th bit of the 23-bit fraction, and 'i' indicates the ith bit selected from the 23-bit significand.

The 32-bit floating point format can enable a pixel value to have a precision having a number of significant decimal digits ranging from 6 to 9. That is, if a decimal string with at most 6 significant decimal digits is converted to IEEE 754 single-precision binary floating-point format and then converted back to the same number of significant decimal digits, the final string should match the original. In other words, if a number in IEEE 754 single-precision binary floating-point format is converted to a decimal string with at least 9 significant decimal digits and then converted back to the IEEE 754 single-precision binary floating-point format, the final number can match the original number.

The resultant image 203 can be stored in the 32-bit floating point format in any suitable image format. An exemplary image format can include Digital Negative (DNG). DNG is an open lossless raw image format written by Adobe Systems (San Jose, Calif., United States) used for digital photography.

In other examples, the resultant image 203 can be stored in any other suitable formats, such as IEEE 754 half-precision binary floating-point format (binary16), IEEE 754 double-precision floating-point format (binary64), IEEE 754, quadruple-precision floating-point format (binary128), and/or any extended precision formats. An exemplary extended precision format includes x86 Extended Precision Format.

The resultant image 203 can be rendered, at 1500, into a preview image. The processor 230 can render the preview image by using any technique. For example, the processor 230 can render the preview image by using tone mapping. Via tone mapping, the processor 230 can map a first set of colors of the resultant image 203 to a second set of colors of the preview image. The new image can thus approximate the appearance of the original image and can be displayed and/or edited on an electronic device that is unable to process the original image.

In some embodiments, the imaging parameter obtained at 1020 can include a selected method for tone mapping. The resultant image 203 can be rendered into an image format that a typical display device can display. An exemplary process for rendering can include tone mapping. Selection of the tone mapping method can be based on personal preference of a user. For example, a selected tone mapping method can result in a smooth-looking image having low visual contrast, while another tone mapping method can result in an image with a greater visual contrast but the contrast may appear overly exaggerated.

For example, the processor 230 can use tone mapping to render a preview image of an HDR image in a medium that has a more limited capability such as a limited dynamic range. In one example, the resultant image 203 can include an HDR image of a 32-bit floating point image format. By using tone mapping, the processor 230 can render the resultant image 203 into an image of 8-bit image format, so a common computer monitor can display the image.

When the processor 230 uses a suitable tone mapping method, the preview image can preserve the image details and color appearance important to appreciate the original scene content even though image contrast is reduced from the scene radiance to a displayable range of the display device. Exemplary methods for tone mapping can include Logarithmic Mapping, exponential mapping, Reinhard Local Photographic Method, and/or Durand Bilateral Filtering Method.

At 1500, the resultant image 203 can be rendered using a tone mapping process so the generated preview image can be suitable for being displayed on a typical display device. Additionally and/or alternatively, the generated preview image can be suitable for editing and/or printing by a common graphic editor such as bitmap graphics editor.

When the resultant image 203 is an HDR image, the tone mapping process can use any suitable tone mapping technique(s) for rendering HDR images. When the tone mapping technique is selected previously (for example, at 1020), the selected tone mapping technique can be used for rendering the resultant image 203 into the preview image.

The preview image can be in a format having a smaller file size than the resultant image 203. An exemplary format for the preview image can include an 8-bit image format. Each pixel of the preview image can be represented by an 8-bit integer, i.e., with possible values ranging from 0 to 255. Typical display devices can display digital images in the 8-bit image format. Therefore, the preview image can advantageously have a small file size and supported by typical display devices.

The preview image can be transmitted, at 1600, for presentation. For example, the preview image can be transmitted to be previewed. For example, the communication module 250 coupled with the processors 230 can transmit the preview image to a computer located remotely from the mobile platform 400. Additionally and/or alternatively, the communication module 250 can transmit the preview image to the communication module 460 coupled with the controller 410. The communication module 460 can transmit the preview image to the computer located remotely from the mobile platform 400. The computer can thus display the preview image for presentation.

Although the preview image may have a reduced file size compared with the raw file of the resultant image 203, the preview image may be able to convey richer information than a selected image of the images 210.

For example, when the preview image can be in an 8-bit image format, the 8-bit image format is a rendering of the resultant image 203 that is an HDR image. However, when the image 211 (shown in FIG. 6) is captured with a high exposure value, the image 212 (shown in FIG. 6) is captured with a low exposure value, the image 211 may show a 'bleaching out' effect in a bright area and the image 212 may be unable to show details in a dark shadow. A photographer may not be able to obtain desired information from solely the image 211 or solely the image 212. In contrast, the preview image rendered based on the resultant image 203 may be able to show selected details both in a bright area and the dark shadow. Thus, one preview image may be sufficient to assist a photographer in evaluating image quality of the obtained resultant image 203.

Further, as the image registration process is no longer necessary, the resultant image 203 can be generated in real time when the mobile platform 400 is operating (for example, when a UAV is operating in air). The resultant image 203 can be rendered into the preview image in real time. The preview image can be transmitted to a remotely-located computer system for presentation in real time. The real time can include a real time of capturing the plurality of images 210.

Thus, the disclosed method 1000 and/or system 100 may help a photographer to evaluate image quality of the obtained resultant image 203 in real time based on the preview image. Thus, the photographer can choose to adjust scene and/or imaging configurations in a timely manner. The photographer can thus seize optimum moment for capturing further images.

For example, when the preview image is unsatisfactory, the photographer may choose to change imaging configurations and capture another plurality of images of the same scene. To change the imaging configurations, the photographer may change imaging parameters (such as changing exposure value difference $\Delta E$, changing number N of images, changing type of bracketing techniques). That is, the system 100 can obtain different imaging parameters and capture another plurality of images for the substantially same scene by using other respective imaging configurations. Stated somewhat differently, the system 100 can capture a first plurality of images of a substantially same scene with a first plurality of imaging configurations, respectively, and then obtain a second plurality of images of the substantially same scene with a second plurality of imaging configurations, respectively. The second plurality of imaging configurations can be at least partially different from the first plurality of imaging configurations.

In another example, when the preview image is satisfactory, the photographer may choose to change a scene for capturing further images. The mobile platform 400 can move or be moved to another position. Alternatively and/or additionally, the imaging device 200 can change direction to capture a substantially same scene. Such a scene can be different from the scene previously captured by the images 210. In that case, the imaging device 200 can then capture another plurality of images for a different scene by using the respective imaging configurations previously used for the images 210. The imaging device 200 can also capture another plurality of images for the different scene by using other respective imaging configurations, which can be at least partially different from the respective imaging configurations previously used for the images 210.

FIG. 8 is an exemplary flow chart illustrating an alternative embodiment of the method 1000 of FIG. 2 for image processing. The method 1300 shown in FIG. 8 can be used for generating the resultant image 203 based on the plurality of images 210.

The exemplary method 1300 is illustratively shown in FIG. 8 as being used for fusing the plurality of images 210 into the resultant image 203 that is an HDR image, and the plurality of images 210 can be previously captured at respective exposure configurations. However, the plurality of images 210 can be previously captured by varying additional and/or alternative image-capturing parameters for image fusion (as shown in other bracketing techniques previously described, for example). The method 1300 can thus process CFA data of the plurality of images 210 to form the resultant image 203 for achieving improved image qualities additional and/or alternative to HDR.

As shown in FIG. 8, a pixel value of a pixel of each of the plurality of images 210 can be optionally normalized, at 1310.

$$J_i^{(p)} = \frac{I_i^{(p)}}{2^{(E_i - E_{ref})}} \quad \text{Equation (3)}$$

where $J_i(p)$ refers to a normalized pixel value of a pixel p of an image i, i indicates an ith image of the images 210 (i.e., i=1, 2, . . . N), $I_i(p)$ refers to a pixel value of the pixel p of the image i, $E_i$ refers to an exposure value of the image i, and $E_{ref}$ refers to a lowest exposure value among the respective exposure values of the images 210. For example, the exposure value $E_i$ can be calculated as follows:

$$E_i = \log_2\left(\frac{T_i}{F_i^2} \frac{S_i}{100}\right) \quad \text{Equation (4)}$$

where $S_i$ refers to an International Organization for Standardization (ISO) speed of the image i, $T_i$ refers to an exposure time of the image i, and $F_i$ refers to a relative aperture (and/or f-number) of the image i. $S_i$, $T_i$, and $F_i$ can be provided by the imaging device 200.

Further, the $I_i(p)$ in Equation (3) can be previously standardized into a value in an interval of [0,1], and can be expressed as a floating point number.

According to the exemplary Equation (3), as the exposure value E increases, the normalized pixel value $J_i(p)$ of the pixel p in the ith image can decrease.

A value for each pixel in the resultant image 203 can be determined based on a weighted average of image data (and/or value) for corresponding pixels in the plurality of images 210. A weight associated with the normalized pixel value $J_i(p)$ can be determined, at 1320. The weight can refer to a statistical weight for calculation. An exemplary weight associated with the normalized pixel value $J_i(p)$ can be calculated as follows:

$$w_i^{(p)} = 1 - (2I_i^{(p)} - 1)^{12} \qquad \text{Equation (5)}$$

The exemplary Equation (5) can result in a greater weight for a pixel value $I_i(p)$ close to 0.5 (i.e., a medium brightness), and a smaller weight for a pixel value $I_i(p)$ close to 0 and/or 1 (i.e., a very low and/or very high brightness).

A pixel value of the pixel of the resultant image 203 can be obtained, at 1330, based on the normalized pixel value $J_i(p)$ and the weight wi(p). For example, the pixel value H(p) of the pixel p of the resultant image 203 can be calculated as follows:

$$H^{(p)} = \Sigma_{i=1}^{N}(w_i^{(p)} \cdot J_i^{(p)}) \qquad \text{(Equation 6)}$$

The pixel value H(p) can represent CFA data of the pixel p of the resultant image 203.

Alternatively, a value for each pixel in the resultant image 203 can be determined by a weighted average of image data for corresponding pixels in the plurality of images 210. The pixel value H(p) can be based on a weighted sum of the normalized pixel value $J_i(p)$ and the weight wi(p), where the weighted sum can be divided by a sum of the weight wi(p), that is:

$$H^{(p)} = \frac{\sum_{i=1}^{N}\left(w_i^{(p)} \cdot J_i^{(p)}\right)}{\sum_{j=1}^{N}\left(w_i^{(p)}\right)} \qquad \text{(Equation 7)}$$

The resultant image 203 can be subsequently stored in a raw image format (as shown at 1400).

As shown in Equations (3)-(6), for a selected pixel, pixel values obtained at different imaging configurations (such as exposure configurations) can be combined to obtain a pixel value for the resultant image 203. Thus, even if one image of the images 210 cannot have an exposure value to capture sufficient information of a scene and/or object, the resultant image 203 can effectively be an image captured using a range of exposure values, instead of a single exposure value. Thus, the resultant image 203 can have a composite exposure value EV having a greater range expanding over the respective exposure values of the image 210. Effectively, exposure capability of the imaging device 200 can be significantly enhanced.

The method 1000 shown in FIG. 8 can be simple to execute. Thus, calculation involved in the method 1000 can be completed within a short time by the processors 230 and/or the processers of the controller 410. Such simple image processing can further enable the system 100 to generate the resultant image 203 in real time.

In some embodiments, the processor 230, the memory 240, and/or the communication module 250 can be at least partially integrated with the imaging device 200, as shown in FIG. 6. In that case, the imaging device 200 can at least partially include the processor 230, the memory 240, and/or the communication module 250. In one example, the imaging device 200 can capture the images 210 and generate the resultant image 203 based on the images 210, render the preview image based on the resultant image 203, store the resultant image 203, and/or transmit the resultant image 203 to another computer system to be previewed.

In other embodiments, the processor 230, the memory 240 can be at least partially integrated with the controller 410, the memory 450 (shown in FIG. 2), respectively. That is, the processor 230, the memory 240 can be at least partially onboard the mobile platform 400. Thus, the imaging device 200 can capture the images 210 and send the images 210 to the controller 410 via the communication module 250. The controller 410 can generate the resultant image 203 based on the images 210, and render the preview image based on the resultant image 203. The memory 450 can be used for storing the resultant image 203. The communication module 460 associated with the mobile platform 400 can transmit the resultant image 203 to another computer system to be previewed. That is, the imaging device 200 can be at least partially be integrated with the mobile platform 400.

Further, the processor 230, the memory 240, and/or the communication module 250 can be at least partially integrated with a computer system (not shown) located remotely from the mobile platform 400. In an exemplary case, the imaging device 200 can send the images 210 to the controller 410 via the bus 490. The communication module 460 can send the images 210 to the computer system. The computer system can generate the resultant image 203 based on the images 210 and/or render the preview image.

Various embodiments disclosed herein further provide a mobile platform 400. The mobile platform 400 can include the system 100 for image processing, as shown in FIG. 2. Furthermore, various embodiments disclosed herein provide a kit for assembling the mobile platform 400 as shown in FIG. 2. The kit can be used for assembling the mobile platform 400 instead of acquiring a factory-assembled mobile platform 400. In certain embodiments, an instruction manual can be included in the kit. The instruction manual may have instructions thereon. When an operator and/or assembly machine follows the instructions, the imaging device 200 and/or the stabilization device 300 can be assembled into the mobile platform 400 as shown in the present disclosure in FIG. 2.

Figure 9:
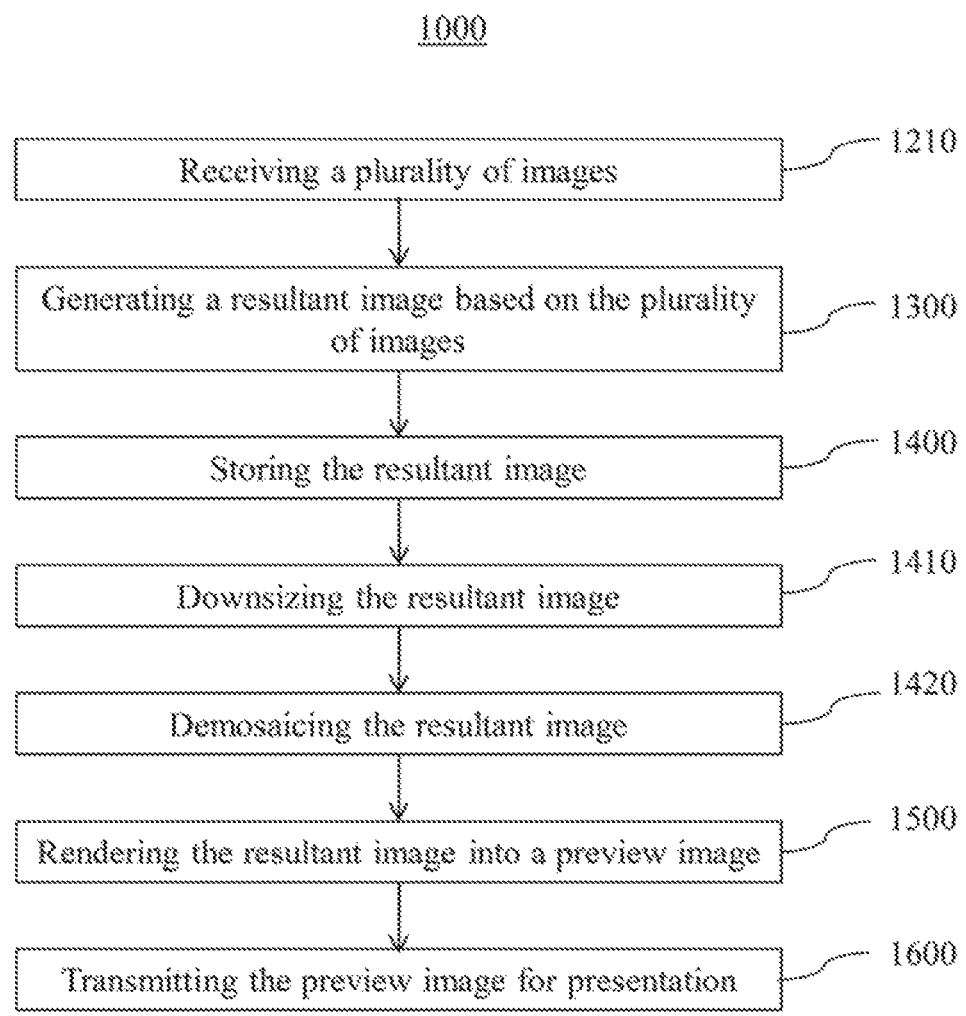
FIG. 9 is an exemplary flow chart illustrating an embodiment of a method for image processing.

Various embodiments further disclose a method for image processing. FIG. 9 is an exemplary flow chart illustrating an embodiment of the method 1000 for image processing. The method can be implemented on the processor 230 (shown in FIG. 6). As shown in FIG. 9, the plurality of images 210 can be received, at 1210.

For example, the processor 230 can receive the plurality of images 210. For example, the processor 230 can be coupled with the imaging device 200 via the bus 490 (shown in FIG. 2) and can receive the plurality of images 210 from the imaging device 200 via the bus 490. Additionally and/or alternatively, the processor 230 can receive the plurality of images 210 from the imaging device 200 via the communication module 250 (shown in FIG. 6).

Receiving of the images at 1210 can be optional. For example, the processor 230 can be integrated with the imaging device 200 and can obtain the plurality of images 210 upon capturing the images 210.

FIG. 9 shows the method 1000 as including generating, at 1300, the resultant image 203 based on the images 210. Further, the method 1000 includes storing, at 1400, the resultant image 203.

Additionally and/or alternatively, as shown in FIG. 9, the resultant image 203 can be downsized, at 1410. In certain processes for using the resultant image 203, a smaller file size and less computation is advantageous. For example, when the resultant image 203 needs to be sent wired or wirelessly to a computer remotely from the mobile platform 400, a reduced file size can reduce burden of data transmission between the computer and the mobile platform 400. In that case, the resultant image 203 can be optionally downsized to form a downsized resultant image.

For example, the resultant image 203 can be downsized using one or more downsampling techniques. Downsampling can use any suitable methods. For example, the resultant image 203 can be downsampled by a factor of n by keeping a value of every nth pixel. In another example, downsampling can use linear interpolation, bilinear interpolation, bicubic interpolation, nearest neighbor interpolation. The file size of the resultant image 203 can be thus reduced.

Optionally, after the downsizing at 1410, the downsized resultant image can be demosaiced (and/or de-mosaiced, demosaicked, debayered), at 1420. Demosaicing can include reconstructing a full color image from incomplete color samples outputted from an image sensor overlaid with the CFA of the imaging device 200. Demosaicing can be also referred to as CFA interpolation or color reconstruction. Thus, the demosaicing process can transform the downsized resultant image 203 into a viewable format that can be rendered by a tone mapping technique. An exemplary method for demosaicing the resultant image 203 can include nearest-neighbor interpolation which copies an adjacent pixel of the same color channel. Another simple method is bilinear interpolation, in which the red value of a non-red pixel is computed as the average of the two or four adjacent red pixels, and similarly for blue and green. Other exemplary methods can include bicubic interpolation, spline interpolation, and Lanczos resampling, which interpolate independently within each color plane. A method called 'variable Number of gradients interpolation' computes gradients near the pixel of interest and uses the lower gradients (representing smoother and more similar parts of the image) to make an estimate. A method called 'Pixel Grouping' uses assumptions about natural scenery in making estimates. A method called 'adaptive homogeneity-directed interpolation' selects the direction of interpolation so as to maximize a homogeneity metric associated with the image 203.

FIG. 9 shows the method 1000 as including rendering, at 1500, the resultant image 203 into a preview image. When the resultant image 203 has been downsized (at 1410) and/or demosaiced (at 1420), the processor 230 can render the downsized and/or demosaiced resultant image 203 into the preview image. After the processor 230 renders the preview image, the method 1000 can include transmitting, at 1600, the preview image for presentation.

Various embodiments further disclose a system 100 for image processing. An exemplary system 100 can include the imaging device 200 as illustratively shown in FIGS. 1, 3-6, wherein the imaging device 200 can be coupled to the stabilization device 300.

Figure 10:
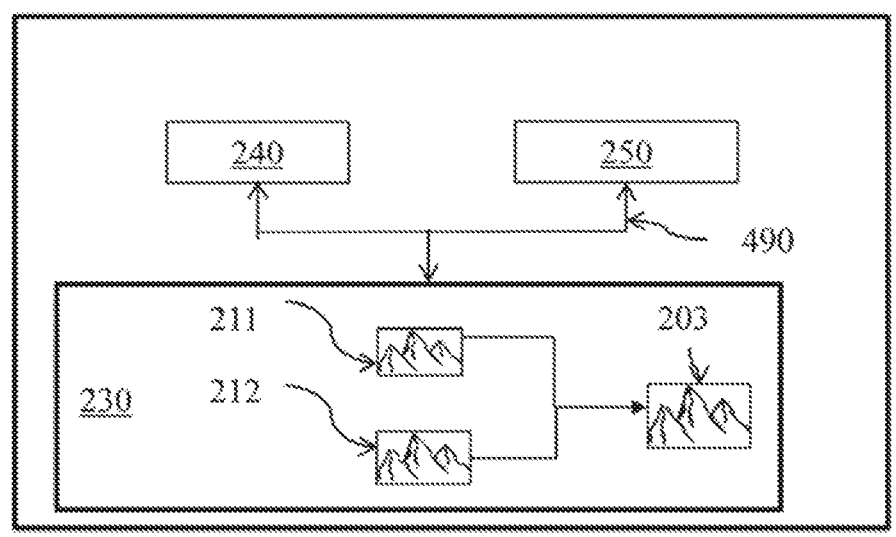
FIG. 10 is an exemplary diagram illustrating an embodiment of a system for image processing, wherein the system includes an imaging device.

FIG. 10 is an exemplary diagram illustrating the system 100 for implementing the method 1000 in FIG. 9. FIG. 10 shows the system 100 as including the processor 230. The system 100 can further include the memory 240 and/or the communication module 250 instructed by the processor 230 for implementing the method 1000 in FIG. 9, and/or the method 1300 in FIG. 8. The processor 230 can be located on the imaging device 200 and/or distal from the imaging device 200.

Various embodiments further disclose computer program product comprising instructions for image processing in accordance with the method 1000 disclosed herein, e.g., as shown in FIGS. 3 and 7-9. The program/software can be stored in a (non-transitory) computer-readable storage medium including, e.g., Read-Only Memory (ROM), Random Access Memory (RAM), internal memory, register, computer hard disk, removable disk, CD-ROM, optical disk, floppy disk, magnetic disk, or the like. The program/software can include coded instructions to instruct one or more processors on a computer device to execute the methods in accordance with various disclosed embodiments.

Figure 11:
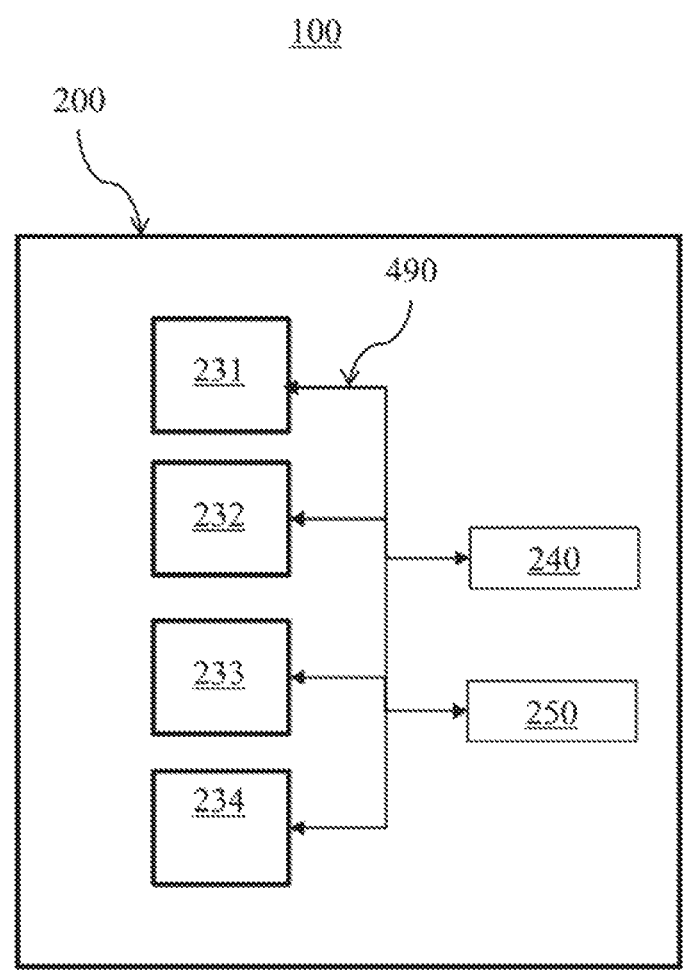
FIG. 11 is an exemplary diagram illustrating an alternative embodiment of the system of FIG. 10, wherein the system includes a plurality of modules for processing an image.

Various embodiments further disclose a system 100 for image processing. FIG. 11 is an exemplary diagram illustrating another alternative embodiment of the system 100 of FIG. 1. The imaging device 200 can include modules 231-234. The modules 231-234 can include microprocessor(s) and/or discrete circuit hardware for implementing functions of the processor 230 as shown in FIG. 8 and/or FIG. 9.

The imaging device 200 can include an image-generating module 231 for generating (shown at 1300 in FIG. 9) the resultant image 203 based on the plurality of images 210. The imaging device 200 can include an image-downsizing module 232 for downsizing (shown at 1410 in FIG. 9) the resultant image 203. The imaging device 200 can include an image-demosaicing module 233 for demosaicing (shown at 1420 in FIG. 9) the resultant image 203. The imaging device 200 can include an image-rendering module 234 for rendering (shown at 1500 in FIG. 9) the resultant image 203 into the preview image.

Further, the imaging device 200 can include the memory 240 and/or the communication module 250 (shown in FIG. 10). The modules 231-234 can be coupled with the memory 240 and/or the communication module 250.

The disclosed method and system as shown in FIGS. 9-11 can generate a resultant image 203 based on the plurality of images 210 captured using respective bracketing configurations. Because the process for generating the resultant image 203 can be simple to implement, the imaging device 200 can generate the resultant image 203 when being onboard the mobile platform 400 (shown in FIG. 2) during operation (such as during a flight in air). The resultant image 203 can be stored, downsized, and/or rendered into a preview image for presentation in real time. Thus, the disclosure set forth herein provides solutions to the technical problems of real-time image generation and image processing on a mobile platform, and further contributes advancement of mobile platform technology as well as image processing technology.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A system for supporting imaging comprising:
   an imaging device carried by a mobile platform and configured to capture a plurality of images for a same scene using respective imaging configurations;

a stabilization device configured to stabilize the imaging device on the mobile platform during the capturing of the plurality of images, the stabilization device including a gimbal configured to support the imaging device and one or more anti-vibration balls configured to couple the gimbal to the mobile platform to damp motion of the mobile platform;

one or more image processors configured to generate a resultant image by fusing the plurality of images without performing image registration among the plurality of images, fusing the plurality of images including:

normalizing a pixel value of a pixel in each of the plurality of images based on the pixel value and an exposure value of a corresponding one of the plurality of images;

determining a weight associated with the normalized pixel value of the pixel in each of the plurality of images; and obtaining a pixel value of the pixel in the resultant image based on the normalized pixel value and the corresponding weight; and a controller communicating with at least one of the imaging device or the stabilization device and configured to control an operation of the mobile platform.

2. The system of claim 1, wherein the one or more image processors are further configured to render the resultant image into a preview image via tone mapping.

3. The system of claim 2, wherein the imaging device is further configured to capture another plurality of images for the same scene by using other respective imaging configurations based on a presentation of the preview image.

4. The system of claim 1, wherein the resultant image has a composite dynamic range that is greater than a dynamic range of a selected one of the plurality of images.

5. The system of claim 1, wherein the controller is further configured to obtain one or more imaging parameters, the one or more imaging parameters including at least one of a parameter for selecting the respective imaging configurations or a parameter for processing a resultant image based on the plurality of images.

6. The system of claim 1, wherein the imaging device is further configured to capture the plurality of images by using respective exposure configurations based on an exposure value difference.

7. An unmanned aerial vehicle (UAV) comprising:
a propulsion mechanism configured to cause a motion of the UAV;
an imaging device configured to capture a plurality of images for a same scene with respective imaging configurations;
a stabilization device coupled to the imaging device and configured to stabilize the imaging device against the motion of the UAV, the stabilization device including a gimbal configured to support the imaging device and one or more anti-vibration balls configured to couple the gimbal to the UAV to damp the motion of the UAV;
one or more image processors configured to generate a resultant image by fusing the plurality of images without performing image registration among the plurality of images, fusing the plurality of images including:
normalizing a pixel value of a pixel in each of the plurality of images normalizing a pixel value of a pixel in each of the plurality of images based on the pixel value and an exposure value of a corresponding one of the plurality of images;
determining a weight associated with the normalized pixel value of the pixel in each of the plurality of images; and
obtaining a pixel value of the pixel in the resultant image based on the normalized pixel value and the corresponding weight; and
a controller communicating with at least one of the imaging device or the gimbal and configured to control an operation of the UAV.

8. The UAV of claim 7, wherein the one or more image processors are further configured to render the resultant image into a preview image via tone mapping.

9. The UAV of claim 7, wherein the resultant image has a composite dynamic range that is greater than a dynamic range of a selected one of the plurality of images.

10. The UAV of claim 7, wherein the controller is further configured to obtain one or more imaging parameters, the one or more imaging parameters including at least one of a parameter for selecting the respective imaging configurations or a parameter for processing a resultant image based on the plurality of images.

11. The UAV of claim 7, wherein the imaging device is further configured to capture the plurality of images by using respective exposure configurations based on an exposure value difference.

12. A method for imaging processing comprising:
stabilizing, via a stabilization device, an imaging device on a mobile platform, the stabilization device including a gimbal configured to support the imaging device and one or more anti-vibration balls configured to couple the gimbal to the mobile platform to damp motion of the mobile platform;
capturing a plurality of images for a same scene via the imaging device using respective imaging configurations; and
generating a resultant image by fusing the plurality of images without performing image registration among the plurality of images, fusing the plurality of images including:
normalizing a pixel value of a pixel in each of the plurality of images based on the pixel value and an exposure value of a corresponding one of the plurality of images;
determining a weight associated with the normalized pixel value of the pixel in each of the plurality of images; and
obtaining a pixel value of the pixel in the resultant image based on the normalized pixel value and the corresponding weight.

13. The method of claim 12, wherein the resultant image has a composite dynamic range that is greater than a dynamic range of a selected one of the plurality of images.

14. The method of claim 12, further comprising:
obtaining one or more imaging parameters, the one or more imaging parameters including at least one of a parameter for selecting the respective imaging configurations or a parameter for processing a resultant image based on the plurality of images.

15. The method of claim 12, wherein capturing the plurality of images includes capturing the plurality of images by using respective exposure configurations based on an exposure value difference.

16. The system of claim 1, wherein the one or more image processors are further configured to:
demosaic the resultant image; and
render the demosaiced resultant image into a preview image for presentation.

17. The system of claim 1, wherein the one or more image processors are further configured to:
- downsize the resultant image;
- demosaic the downsized resultant image; and
- render the demosaiced resultant image into a preview image for presentation.

18. The method of claim 12, wherein normalizing the pixel value includes:
- normalizing the pixel value of the pixel in each of the plurality of images based on the pixel value and an exposure value difference between the exposure value of the corresponding one of the plurality of images and a minimum exposure value among exposure values of the plurality of images.

19. The method of claim 12, wherein obtaining the pixel value of the pixel in the resultant image based on the normalized pixel value and the corresponding weight includes:
- normalizing the weight of the pixel in each of the plurality of images based on a sum of weights of the pixel in the plurality of images; and
- obtaining the pixel value of the pixel in the resultant image based on the normalized pixel value and the corresponding normalized weight.

20. A method for imaging processing comprising:
- stabilizing, via a stabilization device, an imaging device on a mobile platform, the stabilization device including a gimbal configured to support the imaging device and one or more anti-vibration balls configured to couple the gimbal to the mobile platform to damp motion of the mobile platform;
- capturing a plurality of images for a same scene via the imaging device using respective imaging configurations; and
- generating a resultant image by fusing the plurality of images without performing image registration among the plurality of images, fusing the plurality of images including:
  - normalizing a pixel value of a pixel in each of the plurality of images based on the pixel value;
  - determining a weight associated with the normalized pixel value of the pixel in each of the plurality of images;
  - normalizing the weight of the pixel in each of the plurality of images based on a sum of weights of the pixel in the plurality of images; and
  - obtaining a pixel value of the pixel in the resultant image based on the normalized pixel value and the corresponding normalized weight.

* * * * *